US009959008B2

(12) United States Patent
Tan et al.

(10) Patent No.: US 9,959,008 B2
(45) Date of Patent: May 1, 2018

(54) COMPUTER PERIPHERAL DISPLAY AND COMMUNICATION DEVICE PROVIDING AN ADJUNCT 3D USER INTERFACE

(75) Inventors: Min-Liang Tan, Singapore (SG); John Wilson, San Francisco, CA (US); Patrick Hahn, San Francisco, CA (US)

(73) Assignee: RAZER (ASIA-PACIFIC) PTE LTD., Singapore (SG)

( * ) Notice: Subject to any disclaimer, the term of this patent is extended or adjusted under 35 U.S.C. 154(b) by 231 days.

(21) Appl. No.: 14/009,610

(22) PCT Filed: Apr. 13, 2011

(86) PCT No.: PCT/US2011/032294
§ 371 (c)(1),
(2), (4) Date: Feb. 6, 2014

(87) PCT Pub. No.: WO2012/141693
PCT Pub. Date: Oct. 18, 2012

(65) Prior Publication Data
US 2014/0143687 A1 May 22, 2014

(51) Int. Cl.
*G06F 3/048* (2013.01)
*G06F 3/0481* (2013.01)
(Continued)

(52) U.S. Cl.
CPC ............ *G06F 3/0481* (2013.01); *A63F 13/00* (2013.01); *G06F 3/04815* (2013.01);
(Continued)

(58) Field of Classification Search
None
See application file for complete search history.

(56) References Cited

U.S. PATENT DOCUMENTS

2004/0135742 A1* 7/2004 Weber .................. G02B 5/305
345/7
2007/0015580 A1 1/2007 Hunter et al.
(Continued)

FOREIGN PATENT DOCUMENTS

CN 101958089 A 1/2011
EP 2068180 A1 6/2009
(Continued)

OTHER PUBLICATIONS

First Office Action dated Nov. 3, 2015, in Chinese Patent Application No. 201180070009.4.
(Continued)

*Primary Examiner* — William C Trapanese
(74) *Attorney, Agent, or Firm* — Polsinelli PC

(57) ABSTRACT

A system for providing a visual user environment includes a processing unit, a memory, a primary display device for providing a primary visual interface, and an adjunct communication device for providing an adjunct visual interface. In an embodiment, the adjunct display device is configured to present quasi-3D or 3D images. A process can include detecting an adjunct content event corresponding to adjunct visual content associated with an aspect of an application program; and selectively transferring one of an adjunct content notification and adjunct visual content to the adjunct communication device, wherein the adjunct content event corresponds to one of an application program installation sequence, an application program event, an indication of user proficiency in interacting with the application program, a communication session with a remote system, and a predefined visual sequence that is automatically selected for presentation to the user during one of application program installation and application program execution.

77 Claims, 11 Drawing Sheets

(51) Int. Cl.
    *G06F 3/14*     (2006.01)
    *A63F 13/00*     (2014.01)
    *H04L 12/58*     (2006.01)

(52) U.S. Cl.
    CPC ............ *G06F 3/1462* (2013.01); *H04L 51/04* (2013.01); *G09G 2370/022* (2013.01)

(56) References Cited

U.S. PATENT DOCUMENTS

| | | | |
|---|---|---|---|
| 2008/0205874 | A1 | 8/2008 | Chen |
| 2008/0261685 | A1 | 10/2008 | Muir |
| 2009/0251417 | A1 | 10/2009 | Pate et al. |
| 2010/0138780 | A1 | 6/2010 | Marano et al. |
| 2010/0178973 | A1 | 7/2010 | Snoddy et al. |
| 2010/0255912 | A1 | 10/2010 | Ward |
| 2010/0279769 | A1 | 11/2010 | Kidakam |
| 2011/0248958 | A1* | 10/2011 | Gruhlke ................ G06F 3/0416 345/175 |
| 2011/0248963 | A1* | 10/2011 | Lawrence ............ G03H 1/0005 345/175 |
| 2012/0249443 | A1* | 10/2012 | Anderson ................ A63F 13/06 345/173 |

FOREIGN PATENT DOCUMENTS

| | | |
|---|---|---|
| TW | M2658655 U | 5/2005 |
| TW | M298849 U | 10/2006 |
| TW | I306571 B | 2/2009 |

OTHER PUBLICATIONS

First Office Action dated Nov. 25, 2015, in Taiwanese Divisional Application No. 104106876.

English Language Abstract for CN101958089A published Jan. 26, 2011 and retrieved Nov. 19, 2015.

"International Search Report dated Oct. 23, 2011," International Application No. PCT/US2011/032294, 7 pages.

"Cheoptics hologram: Free floating hologram inside a pyramid. Hologram Created by vizoo.com," YouTube, video uploaded Sep. 26, 2006, found at <http://www.youtube.com/watch?v=-k5nt541SE0>, last accessed on Oct. 10, 2014.

Extended European Search Report dated Sep. 15, 2015; in European patent application No. 11863653.9.

Examination Report dated May 31, 2017 in corresponding European Patent Application No. 11863653.9, 5 pages.

* cited by examiner

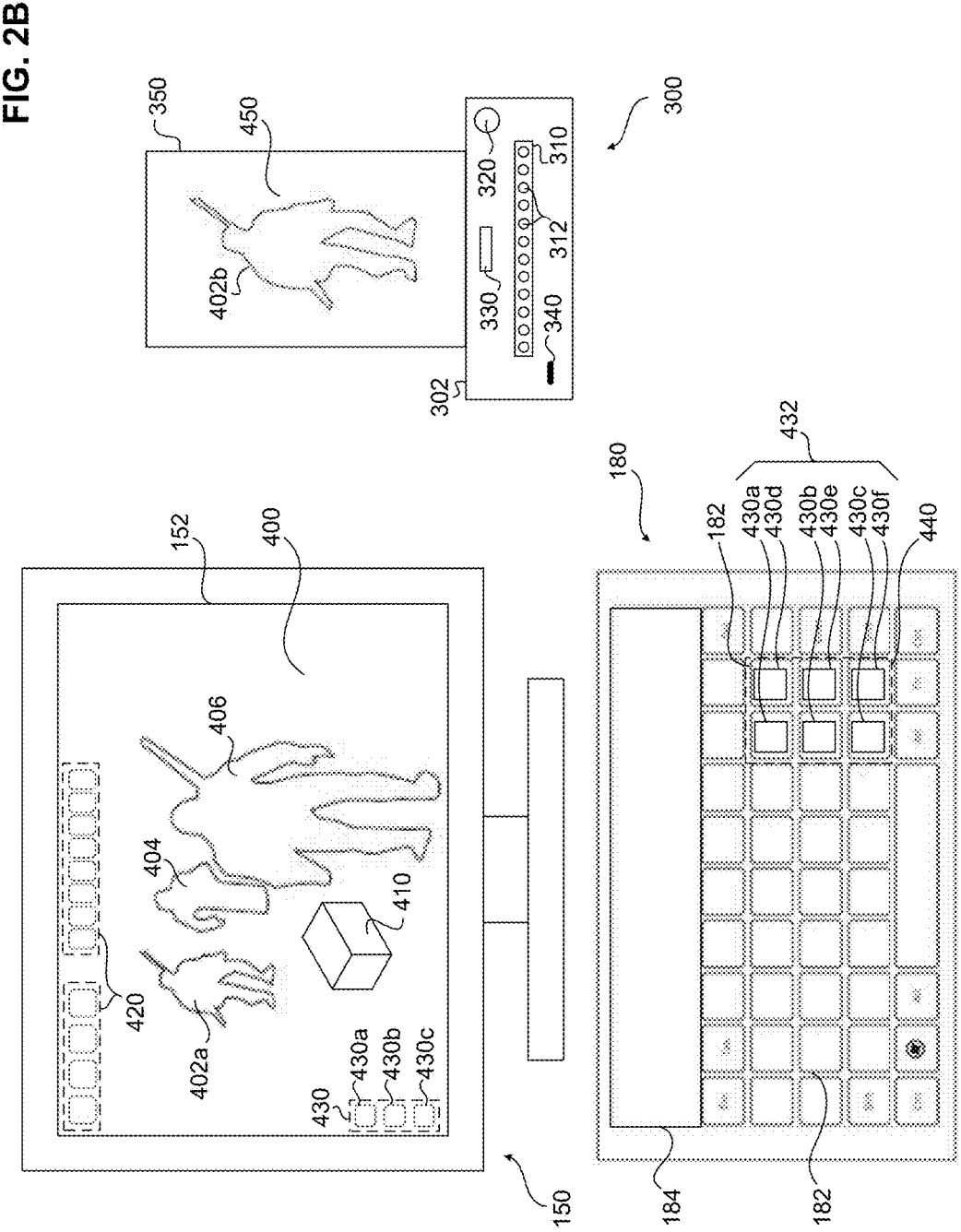

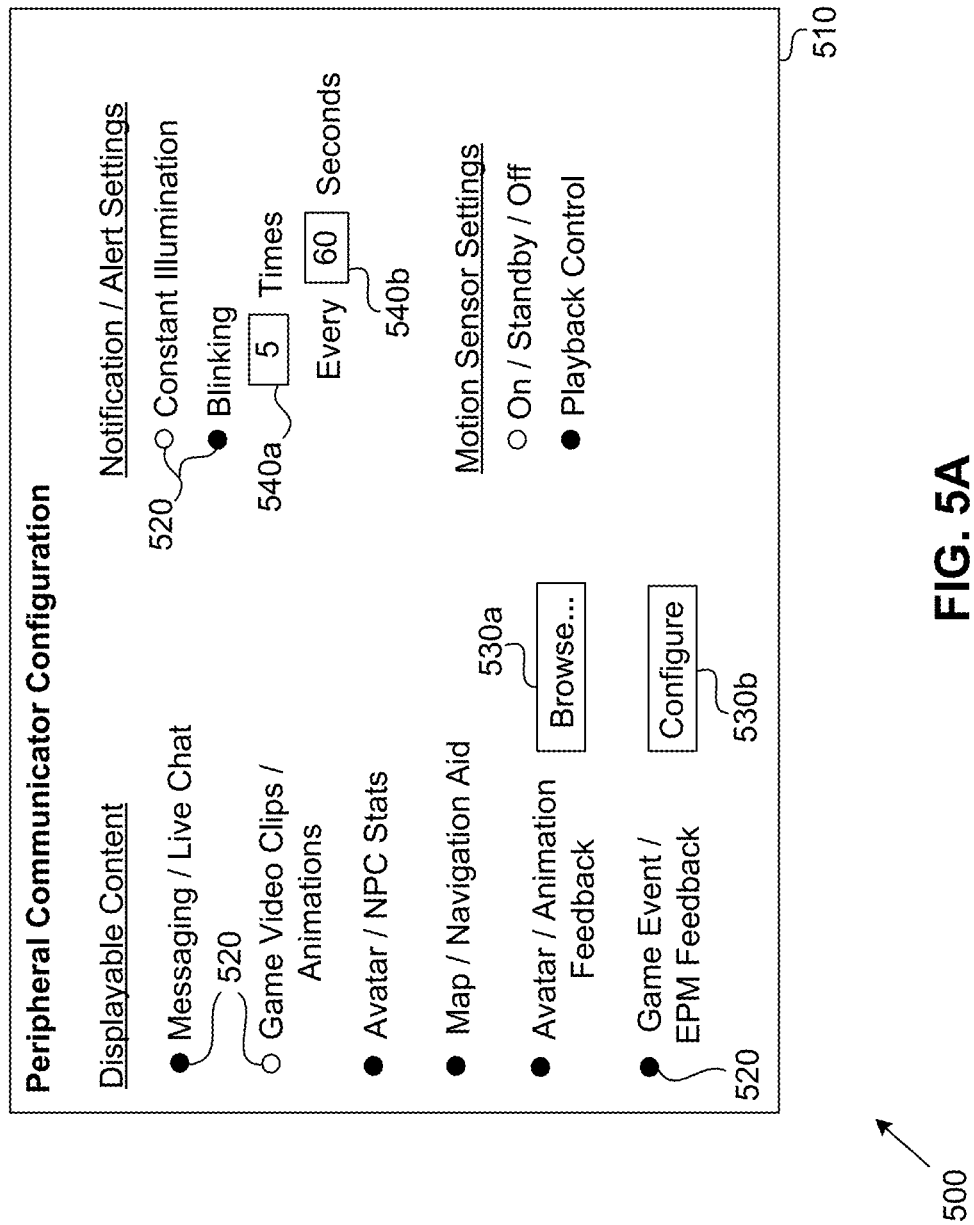

COMPUTER PERIPHERAL DISPLAY AND COMMUNICATION DEVICE PROVIDING AN ADJUNCT 3D USER INTERFACE

TECHNICAL FIELD

The present disclosure relates generally to a user interface architecture that includes a primary user interface and an adjunct or secondary user interface. More particularly, aspects of the present disclosure relate to computing systems and methods in which a primary display device provides a primary visual interface for an application program, and an adjunct communication device provides an adjunct visual interface configured to communicate adjunct information associated with the primary visual interface. In several embodiments, the adjunct communication device generates 3D or quasi-3D images.

BACKGROUND

Electronic games have become increasingly popular in recent decades. Certain types of electronic games have demonstrated particularly strong market growth over time, such as Internet-based massively multiplayer online (MMO) games. MMO games generally involve interactive online environments or platforms (commonly referred to as virtual or online "worlds") that hundreds, or even thousands, of users can access simultaneously. MMO games enable gamers to cooperate and/or compete with each other on a large-scale basis, typically in real time or near real time. One example of a well-known MMO game is World of Warcraft® (Blizzard Entertainment, Irvine, Calif.).

A given MMO game participant, player, gamer, or user is typically represented by an avatar or game character within an interactive online environment. A user navigates within a virtual environment by issuing or generating particular types of commands corresponding to avatar movement. By moving the avatar within or through the virtual environment, the user is able to explore the virtual environment. A user can interact with other gamers and/or non-player characters (NPCs) by interacting with corresponding avatars or characters within the virtual environment, for instance, through cooperating, competing, or fighting. A user can also interact with other gamers using predetermined messaging functions, which cause inter-user communications, such as messages, to be displayed on a display screen.

Game-related graphical information (e.g., scenes within a particular game environment, and interactions between character avatars in such scenes), game details (e.g., avatar and/or NPC status or attributes, or virtual environment maps), and user-to-user messages are displayed on a user's display screen during game play. The increasing complexity and graphical details of many games and the sheer amount of information that can be generated corresponding to user interaction with an interactive online environment or "world" results in an increasing quantity of information being displayed on the user's display screen during game play. In addition, the increasing number of gamers participating in a particular MMO game at any given time, coupled with the increasing number of options and/or opportunities for interaction between the gamers' avatars and/or NPCs, often results in an overload, or an excess amount, of information being provided to a user's display screen.

Display screens can thus become undesirably cluttered or confusing, and portions of a display screen can become visually distracting, as a result of the increasing amount of game related data or information that can be displayed or provided to the user. Unfortunately, the size of a typical computer display screen is commonly inadequate for efficiently or effectively accommodating or presenting all of the required or desired data or information that a user may find useful during game play. Accordingly, improved systems, devices, methods, and/or techniques are needed for presenting game-related information to the user.

Three-dimensional (3D) displays or quasi-3D displays are becoming increasingly popular for enhancing a user's gaming experience. Multiple types of three-dimensional displays or holographic displays can be used for displaying game-related information. However, the application or use of 3D displays has been associated with several limitations, problems, and/or disadvantages. These include a large amount of data that is commonly associated with, or required for, transmitting/receiving 3D images, and a relatively high level of complexity in the actual implementation of 3D displays, which can adversely impact gaming system performance and/or cost.

A need exists for modified, and/or improved systems, devices, methods, and/or techniques for communicating information to gamers during game play. Additionally, a need exists for improved devices and techniques, such as simplified or more efficient 3D information display devices and techniques, which can enhance a user's gaming experiences.

SUMMARY

In accordance with an aspect of the disclosure, a process is directed to providing a user with a visual environment corresponding to an application program by way of a computing or electronic system or device having a processing unit, a memory; a primary display device configured to provide a primary visual interface; and an adjunct communication device configured to provide an adjunct visual interface, the adjunct communication device separate from the primary display device. Such a process includes detecting an adjunct content event corresponding to adjunct visual content associated with an aspect of the application program; and selectively transferring one of an adjunct content notification and adjunct visual content to the adjunct communication device in response to an adjunct content event, wherein the adjunct content event corresponds to one of an application program installation sequence, an occurrence of an application program event, an indication of user proficiency in interacting with the application program, a communication session with a remote system, and a predefined visual sequence that includes one of video data and animation data that is automatically selected for presentation to the user during one of application program installation and application program execution.

The foregoing process can further include retrieving adjunct visual content from at least one of a cloud computing system, a remote server, a remote database, and a local media repository; and presenting adjunct visual content using the adjunct communication device. In some embodiments, the transfer of adjunct visual content to the adjunct communication device includes performing a direct memory access (DMA) transfer of adjunct visual content from a computing system to a display apparatus of the adjunct communication device.

A process in accordance with an aspect of the disclosure can further include generating primary visual content on an ongoing basis during application program execution, the primary visual content corresponding to a current application program execution state; and outputting primary visual content to the primary display device. The primary visual content provides a main source of visual information for user interaction with the application program. In various embodiments, outputting primary visual content to the primary display device on an ongoing basis occurs in a substantially uninterrupted manner during the transfer of adjunct visual content to the adjunct communication device.

A process in accordance with an aspect of the disclosure can also include presenting first adjunct visual content using the adjunct communication device; and avoiding the presentation of the first adjunct visual content by the primary display device. Such presentation of the first adjunct visual content by the adjunct communication device rather than the primary display device can increase an extent to which the primary display device presents primary visual content by increasing at least one of an amount of visual information and an amount of visual detail presented by the primary display device.

An adjunct content event can correspond to visual content for essentially immediate presentation or deferred presentation to the user. In various embodiments, adjunct visual content can include a set of predefined visual sequences, wherein each predefined visual sequence within the set of predefined visual sequences corresponds to a predetermined type of application program outcome corresponding to user interaction with the application program.

In accordance with an aspect of the disclosure, a communication session with a remote system can correspond to communication of one of a pre-recorded message and a request for a live audio and/or visual chat session. A pre-recorded message can correspond to one of a message from a remote user associated with the remote system, an application program upgrade, and an add-on to the application program.

A process in accordance with an aspect of the present disclosure can also include receiving a communication from a remote system; generating an adjunct communication notification in response to the communication received from the remote system; and presenting adjunct visual content using the adjunct communication device while the computing system is in an online mode in which network communication can occur, or an offline mode in which network communication does not occur. Generating an adjunct communication notification can include changing a display state of a graphical element displayed by one of the primary display device and a display-enabled user input apparatus that is separate from the adjunct communication device.

An adjunct communication device can include an illumination apparatus, and a process according to an aspect of the disclosure can include changing an illumination state of the illumination apparatus in a manner that corresponds to an adjunct content event, such as by selectively generating optical signals in a manner that provides an indication of one of an occurrence of a predetermined application program event and a level of user proficiency in interacting with the application program.

An adjunct communication device can also include a set of adjunct input devices. For instance, a set of adjunct input devices can include a set of sensors configured to detect at least one of user proximity, user presence, user motion, and user gestures in a spatial region proximate to the adjunct communication device. An adjunct content event can correspond to a signal generated by an adjunct input device within the set of adjunct input devices.

In some embodiments, an application program includes an electronic game, for instance, a single player or interactive electronic game corresponding to at least one of a strategy game, a tactical game, an adventure game, a visual novel, an interactive movie, an action-adventure game, a role playing game, a navigation game, a combat game, a first person game, a third person game, a vehicular game, an educational game, a training game, a simulation game, a maze game, a puzzle game, a trivia game, a board game, a card game, a gambling game, a music game, a dance game, a sports game, an exercise game, and a party game. In certain embodiments, the application program corresponds to an MMO game.

A process in accordance with an aspect of the disclosure can include determining whether a first predetermined type of application program outcome within a set of predetermined types of application program outcomes has occurred during application program execution; and transferring a first predefined visual sequence within the set of predefined visual sequences to the adjunct communication device in response to occurrence of the first predetermined type of application program outcome. For instance, the first predetermined type of application program outcome can correspond to an electronic game event, outcome, condition, scenario, or situation, which can correspond to one of a user transition to a next game level, user interaction with a non-player character, user interaction with a remote user, or another type of electronic game event.

A process in accordance with an aspect of the disclosure can also include generating an adjunct communication device configuration interface that includes a set of graphical controls responsive to user input for selectively defining types of visual information as adjunct visual content to be transferred to the adjunct communication device. Such a process can further include determining at least one of an amount of visual information and an amount of visual detail within primary visual content presented to the user based upon user input directed to the adjunct communication device configuration interface.

A process in accordance with an aspect of the present disclosure can include avoiding the transfer of adjunct visual content to the adjunct communication device in the absence of an initialization process by which the computing system recognizes the adjunct communication device, and can further include outputting adjunct visual content to the primary display device rather than transferring adjunct visual content to the adjunct communication device in the absence of such an initialization process.

In response to an initial detection of a coupling that enables signal communication between the processing unit and the adjunct communication device, a process in accordance with an aspect of the disclosure can include performing a set of adjunct communication device initialization operations that includes automatically transferring adjunct communication device firmware from the memory to the adjunct communication device. In several embodiments, adjunct communication initialization operations can occur in association with a peripheral device enumeration process.

In accordance with an aspect of the present disclosure, a system is configured for providing a user with a visual environment corresponding to an application program, the visual environment including a primary visual interface and an adjunct visual interface, the primary visual interface providing a main source of visual information for user interaction with the application program. The system includes a processing unit; a primary display device coupled to the processing unit; an adjunct communication device separate from the primary display device and couplable to the processing unit, the adjunct communication device including a display apparatus configured to output images having at least two dimensional characteristics; and a set of memories coupled to the processing unit, the set of memories storing program instructions including a portion of an application program configured to manage the generation of primary visual content and the transfer of the primary visual content to the primary display device in association with application program execution; and an adjunct communication manager configured to manage adjunct communication operations such as those described herein, including determining whether an adjunct content event has occurred; and selectively transferring one from the group of an adjunct content notification and adjunct visual content to the adjunct communication device in response to the occurrence of an adjunct content event, wherein the adjunct content event corresponds to one of an application program installation sequence, an occurrence of an application program event, an indication of a level of user proficiency in interacting with the application program, a communication session with a remote system, and a predefined visual sequence that includes one of video data and animation data that is automatically selected for presentation to the user during one of application program installation and application program execution. The system can further include at least one of a local adjunct information source and a remote adjunct information source from which adjunct visual content can be acquired or retrieved.

In various embodiments, an adjunct communication device is configured to output images having one of quasi-3D and 3D characteristics; and a primary display device can be configured to output images having one of 2D, quasi-3D, and 3D characteristics.

A visual environment in accordance with an aspect of the disclosure includes a set of user selectable graphical elements configured to control aspects of adjunct communication device operation in response to user input, and wherein at least one of the application program and the adjunct communication manager is configured to manage the visual presentation of the set of user selectable graphical elements. The set of memories can further store program instructions corresponding to an adjunct communication device configuration module for generating a configuration interface by which particular types of visual content can be selectively identified as adjunct visual content for presentation by the adjunct communication device in response to user input.

In some embodiments, at least a portion of the application program and the adjunct communication manager are executed by a local computing system. In other embodiments, the adjunct communication manager is executed by a local computing system and at least a portion of the application program is executed by a remote computing system (e.g., an electronic game server, or an electronic gaming cloud) configured for network communication with the local computing system.

In several embodiments, the adjunct communication device includes a Direct Memory Access (DMA) controller. The adjunct communication device can exclude a frame buffer for storing incoming adjunct visual content directed to the adjunct communication device.

An adjunct communication device can include an illumination apparatus configured to output illumination signals corresponding to an adjunct content event. For instance, the illumination apparatus can be configured to output illumination signals that provide one of an indication of adjunct visual content available for user selection, an occurrence of a predetermined application program event, and an indication of a level of user proficiency in interacting with the application program.

An adjunct communication device can additionally or alternatively include a set of adjunct input elements configured to detect one of user proximity, user presence, user motion, and user gestures in a spatial region proximate to the adjunct communication device.

The system can include a first communication interface (e.g., a first USB interface) corresponding to the processing unit, and a second communication interface (e.g., as a second USB interface) corresponding to the adjunct communication device. The processing unit and the adjunct communication device can be selectively or selectably coupled by way of the first and second communication interfaces.

An adjunct communication device in accordance with the present disclosure can be configured to retrieve adjunct communication device firmware in association with adjunct communication device initialization operations. Such initialization operations can be performed in association with a peripheral device enumeration process (e.g., a USB enumeration process).

Certain embodiments of a system in accordance with an aspect of the disclosure include a display-enabled user input apparatus coupled to the processing unit, the display-enabled user input apparatus separate from the adjunct communication device and having a set of user selectable input elements configured to transmit optical signals corresponding to graphical images. A set of user selectable graphical elements configured for controlling aspects of adjunct communication device operation in response to user input can be displayable by at least one of the primary display device and the display-enabled user input apparatus.

BRIEF DESCRIPTION OF THE DRAWINGS

Embodiments of the disclosure are described hereinafter with reference to the following drawings, in which:

FIG. 2B is an illustration of a primary display device, an adjunct communication device, and a display-enabled user input apparatus, as well as respective portions of a primary visual interface, an adjunct visual interface, and an input device visual interface according to an embodiment of the disclosure.

FIG. 5A is a schematic illustration of a representative adjunct communication device configuration interface according to an embodiment of the disclosure.

DETAILED DESCRIPTION

Figure 1A:
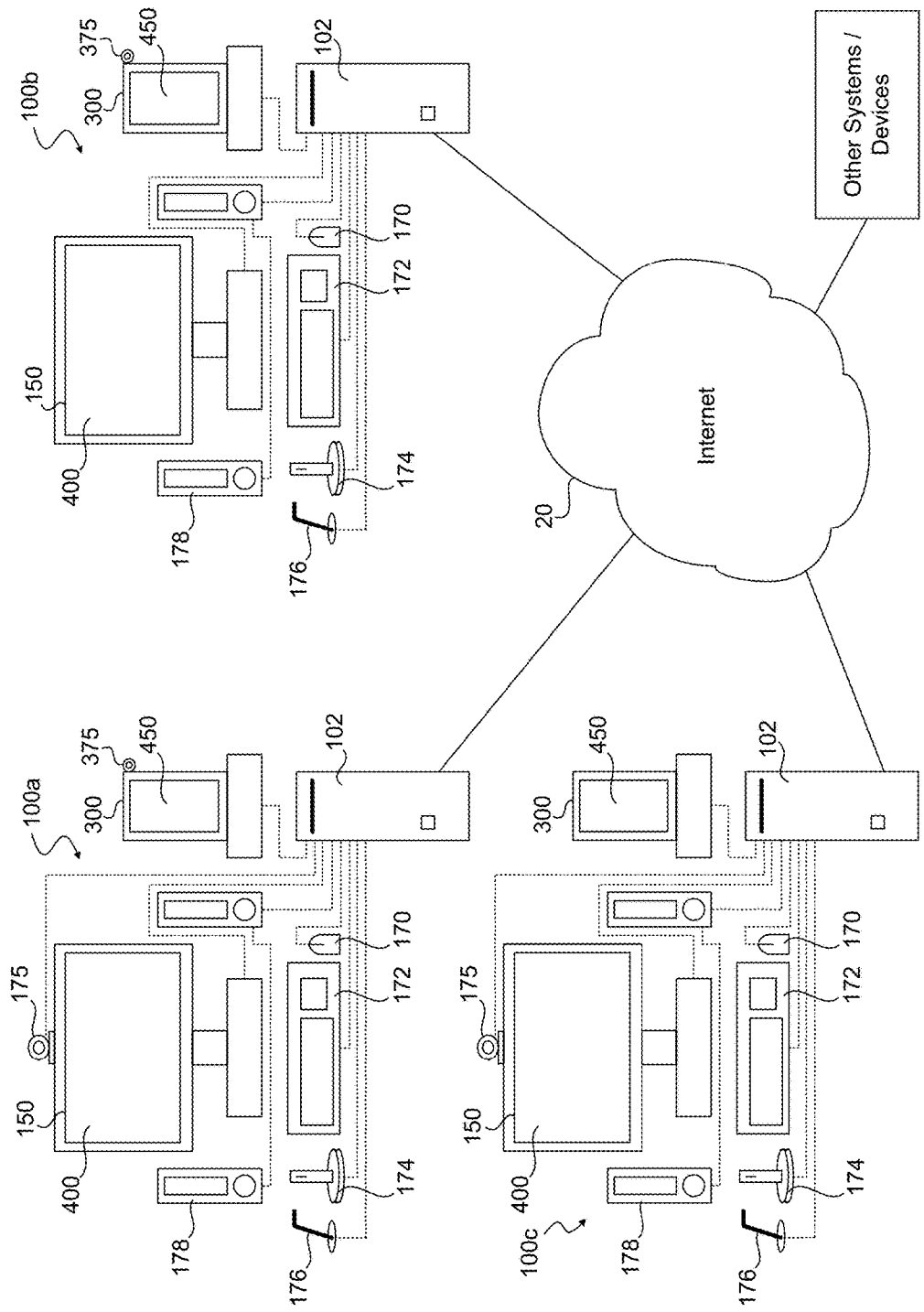
FIG. 1A is a block diagram of a user interface architecture according to an embodiment of the present disclosure.

In general, a user interface can encompass hardware, software (e.g., program instructions corresponding to one or more of firmware, a device driver, an operating system, and an application program), generated visual constructs (e.g., icons, graphical widgets, visual environments or scenes, and/or character avatars), generated effects (e.g., lighting effects or sounds), and/or communicated information (e.g., notifications or messages) that facilitate or effectuate a user's interaction with one or more automated, computerized, or electronic systems or devices, and/or other users of such systems or devices.

Various embodiments of the present disclosure are directed to a user interface architecture in which a computing or electronic system or device is configured to provide 1) a primary user interface that enables user interaction with one or more application programs and/or other users; and 2) an adjunct, supplemental, counterpart, or secondary user interface that complements, enhances, or further facilitates user interaction with the primary user interface, the application program(s), and/or other users. In general, an adjunct user interface is configured to present particular types of adjunct information to the user. Adjunct information can include one or more of adjunct visual content, signals, or data; adjunct audio content, signals, or data; and adjunct content notifications or alerts that provide an indication to the user that adjunct content is available or selectable for presentation. Embodiments of the present disclosure are additionally directed to structural and functional aspects of particular adjunct user interface devices, and processes for communicating certain types of information, signals, or data by way of such devices.

The primary user interface includes a primary visual interface, and the adjunct user interface includes an adjunct visual interface that is separate or distinct from the primary visual interface. Thus, embodiments of the present disclosure provide a user with a visual environment that includes a primary visual interface and an adjunct visual interface. In multiple embodiments, the primary visual interface is configured to provide, present, or output primary visual information, content, or data that is dynamically or progressively updated (e.g., in a real time, near-real time, quasi-real time, synchronous, or generally synchronous manner) in accordance with the current execution state or context of a set of local and/or remote application programs. For instance, application program execution state can evolve in response to local and/or remote user interaction with (e.g., user input directed to) a set of corresponding local and/or remote application programs. Primary visual information provided by the primary visual interface can visually indicate or correspond to a current application program execution context and a current state or status of one or more users at any given time.

The adjunct visual interface is configured to selectively provide or present particular types of adjunct visual information, content, or data that can be associated with, related to, or supportive of application program subject matter or application program execution. For instance, adjunct visual information can include data that remains persistent or which can be selectively retrieved, generated, presented, interrupted or recalled while the primary visual interface is progressively updated during application program execution. In some embodiments, adjunct visual information includes data that can be presented before or after application program execution, such as during an application program installation sequence. Depending upon embodiment details, adjunct visual information can correspond to 1) a chronology, narrative, or sequence of events associated with an application program; 2) one or more visual or graphical elements, objects, symbols, emblems, constructs, or entity or object representations (e.g., game characters or objects) associated with an application program; 3) information or data received from other users; and/or 4) other information. The adjunct visual interface can enhance or facilitate a user's interaction with the primary visual interface, an application program, and/or other users, thereby enhancing a user's visual experience(s) during application program execution. In several embodiments, the adjunct visual interface includes a 3D or quasi-3D interface.

For purpose of brevity and to aid understanding, multiple embodiments of the present disclosure are directed to a computer or electronic gaming user interface architecture. In such embodiments, an application program includes program instructions corresponding to a computer or electronic game (e.g., a single player or stand-alone computer game, or a multi-player computer game, for instance, an interactive online game, which in some embodiments can be an MMO game that can involve dozens, hundreds, or even thousands of users, players, or participants). Additionally or alternatively, an application program can include program instructions corresponding to user-to-user messaging or communication; user interaction with a virtual world or virtual community; user education/training; or other applications. The embodiments provided by the present disclosure are not precluded from applications in which particular fundamental structural and/or operational principles described herein are desired.

Representative embodiments of the disclosure for addressing one or more of the foregoing problems associated with conventional user interfaces are described hereafter with reference to FIGS. 1A to 6. In the description that follows, like or analogous reference numerals indicate like or analogous elements. Additionally, the recitation of a given reference numeral shown in a particular FIG. can indicate the simultaneous consideration of another FIG. in which such reference numeral is also shown.

In the present disclosure, the term set is defined as a non-empty finite organization of elements that mathematically exhibits a cardinality of at least 1 (i.e., a set as defined herein can correspond to a singlet or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)). In general, an element of a set can include or be a system, an apparatus, a device, a structure, an object, a signal, a function or functional process, or a value depending upon the type of set under consideration.

Architectural Overview

FIG. 1A is a block diagram of a user interface architecture 10 according to an embodiment of the present disclosure. In an embodiment, the user interface architecture 10 includes at least one computing or electronic system or device (e.g., a desktop computer, a laptop computer, a cloud computing device, a game console, or a mobile computing, gaming, or communication device) 100 configured to provide a user with a primary user interface as well as an adjunct user interface by way of 1) program instructions that are executable by way of a local and/or remote processing system 102; and 2) a number of peripheral devices configured to receive input from and/or provide output to one or more individuals. Such peripheral devices include a primary display device 150 configured to provide a primary visual interface 400, and an adjunct communication device 300 configured to provide at least an adjunct visual interface 450, as further described below.

In some embodiments, the peripheral devices can further include one or more of a computer mouse 170; a keyboard 172; a game control device 175 such as a joystick, a game pad, or other type of controller (e.g., a presence, motion, position, orientation, or gesture sensing controller); a video camera 175; a microphone 176; and a set of speakers 178. Couplings between the computing system 100 and particular peripheral devices can be wireless or wire-based, in a manner understood by one of ordinary skill in the art. In certain embodiments, the adjunct communication device 300 includes a camera 375. The adjunct communication device 300 can also include a microphone, which can be built into or integrated with the camera 375. Depending upon embodiment details, a computing system or computing device 100 of a user interface architecture 10 according to an embodiment of the present disclosure can be a stand-alone system or device, or a networked system or device that is coupled to at least one communication medium 20 such as a Local Area Network (LAN), a Wide Area Network (WAN), the Internet, and/or a cloud computing infrastructure.

Figure 1B:
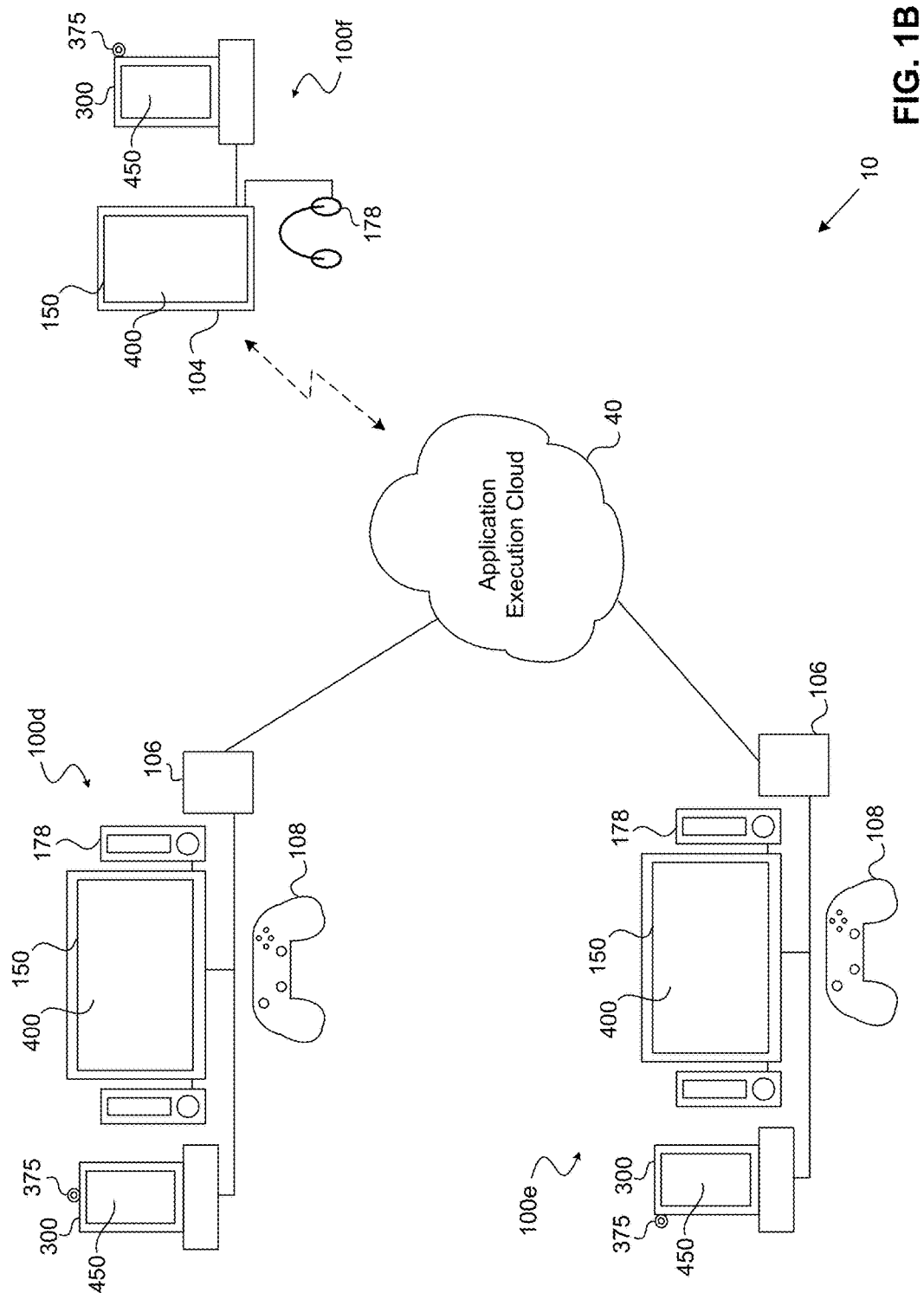
FIG. 1B is a block diagram of a user interface architecture according to another embodiment of the present disclosure.

FIG. 1B is a block diagram of a user interface architecture 10 according to another embodiment of the present disclosure. In an embodiment, the user interface architecture 10 includes at least one computing or electronic system or device 100 that is coupled to an application execution cloud 40 corresponding to a cloud computing infrastructure 20. The computer or electronic system or device 100 includes a primary display device 150 configured to provide a primary visual interface 400, and an adjunct communication device 300 configured to provide an adjunct visual interface 450. A given computing or electronic system or device 100 can include, for instance, a tablet computer 104 or cloud gaming device 106 that is coupled to the primary display device 150 and the adjunct communication device 300, and which is configured for communication with the application execution cloud 40. Depending upon embodiment details, an embodiment involving a cloud gaming device 106 can include a game controller 108. Additionally, a given computing or electronic system or device 100 can include a set of speakers or headphones 178.

Aspects of Representative Primary and Adjunct User Interfaces and Devices

Figure 2A:
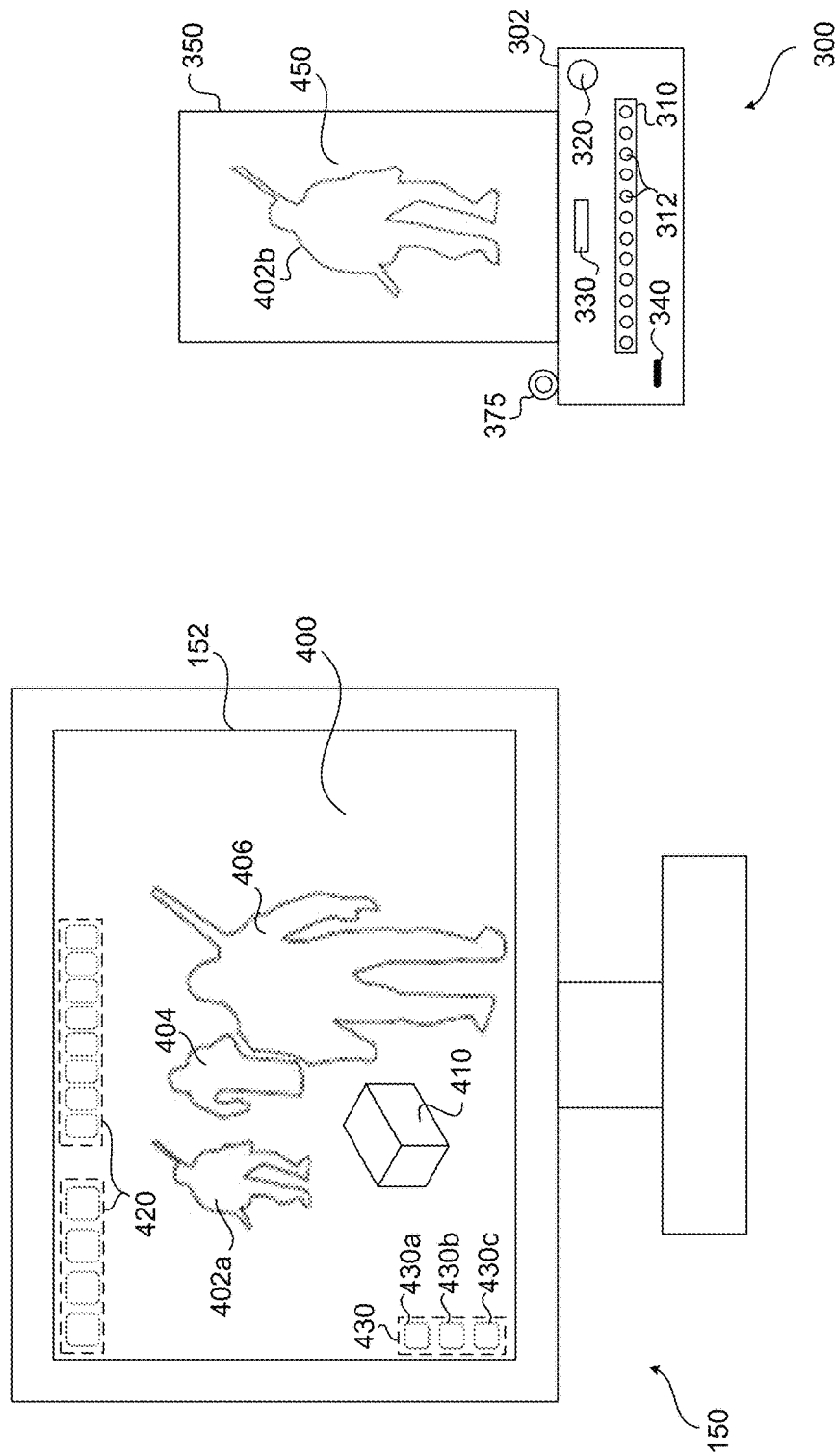
FIG. 2A is an illustration of a primary display device and an adjunct communication device, as well as respective portions of a primary visual interface and an adjunct visual interface according to an embodiment of the disclosure.

FIG. 2A is an illustration of a primary display device 150 and an adjunct communication device 300 according to an embodiment of the disclosure. The primary display device 150 can be, for instance, a 2D or 3D display device (i.e., a device that can present visual information in two or more spatial dimensions, such as images having at least two dimensional characteristics) configured to present, output, display, or generate video, graphical, and textual information, signals, or data. In a representative implementation, the primary display device 150 can be a computer or television display device (e.g., a computer monitor, flat screen television, or another type of visual information presentation device).

The adjunct communication device 300 includes an adjunct display apparatus 350 configured to present, output, display, or generate video, graphical, and textual information, signals, or data. As further detailed below, in several embodiments the adjunct display apparatus 350 is configured to produce 3D or quasi-3D images. The adjunct communication device 300 can also include or be associated with an illumination apparatus 310 configured to output illumination signals corresponding to a user performance level and/or application program notifications, conditions, or events as further described below. Additionally, the adjunct communication device 300 can include a set of speakers 320 configured to output audio signals, and/or a set of sensors, sensing devices, or sensing elements such as one or more proximity, presence, motion, and/or user tracking or monitoring sensors 330 that can detect user presence, movement, and/or gestures proximate to the adjunct communication device 300. Finally, the adjunct communication device 300 includes at least one user interface coupling or port 340 (e.g., a USB port and/or another type of communication interface) that enables communication (e.g., signal or data transfer or exchange) with elements of the computing system 100. In several embodiments, the adjunct communication device 300 forms portions of or is a computer peripheral device that can be selectively coupled to at least one main or host system, device, or processor 102 by way of such user interface coupling(s). Each element of the adjunct communication device 300 can be carried by or coupled to portions of a common base or support structure 302.

FIG. 2A additionally illustrates portions of a representative primary visual interface 400 generated by the primary display device 150 and a representative adjunct visual interface 450 generated by the adjunct communication device 300 in accordance with an embodiment of the disclosure. In FIG. 2A, the primary visual interface 400 and the adjunct visual interface 450 are each configured to present visual information relating to representative aspects of a computer game.

In accordance with multiple embodiments of the disclosure, a primary visual interface 400 and/or a adjunct visual interface 450 can be configured to respectively present primary and adjunct visual content corresponding to essentially any type of computer or electronic game or game environment, for instance, a game or game environment corresponding to or categorized as one or more of a strategy game, a tactical game, an adventure game, a visual novel, an interactive movie, an action-adventure game, a role playing game, a navigation game, a combat game, a first person (e.g., first person shooter) game, a third person (e.g., third person shooter) game, a vehicular (e.g., racing) game, an educational game, a training game, a simulation (e.g., a life scenario, construction, business, aircraft, spacecraft, or other type of simulation) game, a maze game, a puzzle game, a trivia game, a board game (e.g., checkers, chess, or mahjong), a card game, a gambling game, a music game, a dance game, a sports game, an exercise game, a party game, and/or another type of game.

Embodiments of the disclosure can be configured to provide a user interface architecture 10 corresponding to essentially type of single-player or multi-player computer or electronic game. For purpose of brevity and clarity, portions of the description herein are directed to embodiments of a user interface architecture 10 configured to provide a primary visual interface and an adjunct visual interface corresponding to an interactive multi-player game, such as an MMO game. An MMO game can be, for instance, an MMO Role Playing Game (MMORPG), an MMO Real Time Strategy (MMORTS) game, an MMO First Person Shooter (MMOFPS) game, an MMO Social Game (MMOSG), an MMO Sports Game (MMOSG), or other type of MMO game. Notwithstanding the foregoing, embodiments of the disclosure can be configured to provide a primary visual interface and an adjunct visual interface corresponding to essentially any type of single-player or multi-player computer or electronic game.

The primary visual interface 400 provides the main viewable interface by which game play occurs, that is, by which real time, near-real time, synchronous, essentially or approximately synchronous, or progressive user interaction with the game and user responsive advancement of game play occurs. In other words, the primary visual interface 400 provides the main source of visual information or content by which the effects of local and/or remote game player input upon game program execution are conveyed to the user. The primary visual interface 400 thus provides or presents visual information, signals, or data (e.g., video, image based, graphical, symbolic, and/or textual content) that serves as the user's primary source of visual subject matter that facilitates or enables the user's game play. Primary visual content can include video clips, images, and/or graphical animations, renderings, or scenes corresponding to a narrative (e.g., associated with a storyboard) and/or a virtual world or environment (e.g., a virtual landscape); one or more portions of game-related characters, such as a set of character avatars that can correspond to a user's avatar 402a, other game player avatars 404, 406, and/or non-player character (NPC) avatars; character status information (e.g., character strength or energy level); one or more objects 410 in the virtual environment; a number of user selectable graphical game play controls 420 (e.g., buttons, action keys, or action bars) for controlling aspects of game play; and/or other visual information.

In some embodiments, the primary visual interface 400 can be configured to include a set of user selectable visual or graphical adjunct communication device controls 430 (e.g., buttons, pop-up menus, and/or other graphical elements) for configuring and/or controlling aspects of adjunct communication device operation, such as a first, a second, and a third graphical adjunct communication device control 430a-c as further detailed below. The primary display device 150 presents visual information in a window 152, and updates the window's contents continuously or progressively during game play, e.g., in a manner that is synchronous or generally synchronous with input, commands, or actions corresponding to one or more players, as readily understood by one of ordinary skill in the art.

In various embodiments, the adjunct visual interface 450 provides or presents adjunct visual content that can include video, graphical, and/or textual information, signals, or data that relates or corresponds to aspects of a game, and which serves as adjunct, complementary, counterpart, or corollary visual content or subject matter to the primary visual content or subject matter. In general, primary visual content is updated on a more frequent and/or more continuous basis than adjunct visual content across a time period in which the user interacts with the application program, such as across a game session during which the user actively engages in game play. For instance, in typical situations, an overall number of primary visual interface updates or refresh cycles or operations exceeds an overall number of adjunct visual interface updates or refresh cycles or operations with respect to the overall duration of game play.

In accordance with embodiments of the disclosure, the combination of an adjunct visual interface 450 provided by an adjunct communication device 300 and the primary visual interface 400 provided by a primary display device 150 can synergistically facilitate or enhance game play and/or the user's game related experience(s). Additionally, such a combination can aid efficient utilization of the primary visual interface 400. More specifically, the presentation of primary visual content or subject matter by way of the primary display device 150 and the predetermined, selective, programmable, or selectable presentation of adjunct visual content or subject matter by way of the adjunct communication device 300 can increase or maximize an extent to which the primary visual interface 400 remains available for presenting information that enables dynamic, synchronous, or generally synchronous user interaction with the game.

The presentation of particular types of adjunct visual content (e.g., game related information, signals, or data) by the adjunct visual interface 450, such as one or more types of information that can be presented asynchronously with respect to game play, and the exclusion or omission of such information, signals, or data from the primary visual interface 400 can increase or maximize an amount of active game area that the primary visual interface 400 displays or can display, for instance, by increasing a primary display device viewing area or viewing volume within which primary visual content can be presented to the user. Thus, the presentation of particular types of adjunct visual content by the adjunct visual interface 450 rather than the primary visual interface 400 can increase an extent to which the primary visual interface 400 conveys or is available to convey visual content (e.g., primary visual content) to the user. By presenting particular adjunct visual content using the adjunct communication device 300 and avoiding the presentation such adjunct visual content using the primary display device 150, an amount of visual information and/or an amount or level of visual detail conveyed to the user by the primary visual interface 400 can be increased or maximized.

Certain embodiments in accordance with the present disclosure can include one or more user input devices such as a keyboard, keypad, mouse, joystick, or game controller that incorporates or carries a set of user input elements such as keys or buttons, as well as display elements such as LCD or LED (e.g., organic LED (OLED)) elements corresponding to or carried by such user input elements. Such a user input device can cooperatively, selectably, or programmably provide particular visual content in association with the presentation of visual content by the primary display device 150 and/or the adjunct display apparatus 300, as further described in detail hereafter.

FIG. 2B is an illustration of a primary display device 150, an adjunct communication apparatus 300, and a display-enabled user input apparatus 180 that form portions of a user interface architecture 10 according to an embodiment of the disclosure. In an embodiment, a display-enabled user input apparatus 180 includes a user input device such as a keyboard or keypad having a number of keys or buttons 182, at least some of which are configured to transmit or output optical signals on a selectable, programmable, dynamic, variable, or modifiable basis. Such optical signals can correspond to or include images, graphics, icons, symbols, and/or text. The display-enabled user input apparatus 180 can additionally include one or more other types of display device or elements 184, such as an LCD or LED display (e.g., an OLED display), which can be touch sensitive.

In a representative implementation, a display-enabled user input apparatus 180 can correspond to, include, or be based upon one or more types of devices described in Patent Cooperation Treaty (PCT) Application entitled "Optically Transmissive Key Assemblies for Display-Capable Keyboards, Keypads, or Other User Input Devices," filed on 4 Jan. 2011 PCT/US11/20214; and/or PCT application entitled "Systems and Methods for Managing, Selecting, and Updating Visual Interface Content Using Display-Enabled Keyboards, Keypads, and/or Other User Input Devices," filed on 4 Jan. 2011, each of which is incorporated herein by reference in its entirety. Additionally or alternatively, in a representative implementation, a display-enabled user input apparatus 180 can correspond to, include, or be based upon an Optimus Maximus, Optimus Popularis, Optimus Tactus, Optimus Mini Three, or Optimus Aux keyboard, developed by the Art.Lebedev Studio, Moscow, Russia (www.artlebedev.com).

Portions of the display-enabled user input apparatus 180 can selectively provide an input device visual interface 440 that provides user selectable visual content, which can include visual content that is based upon, representative of, or corresponds to particular primary visual interface content. For instance, in a representative embodiment, an input device visual interface 440 can present, display, or output a set of visual or graphical adjunct communication device controls 432, which can include one or more user selectable (a) graphical controls 430a-c that are visually identical, essentially identical, analogous to, or representative of the aforementioned user selectable graphical adjunct communication device controls 430a-c that are displayed or displayable by the primary visual interface 400 at one or more times; and/or (b) graphical controls 430d-f that are distinct from the graphical adjunct communication device controls 430a-c that are displayed or displayable by the primary visual interface 400 at one or more times.

In response to user selection of a particular visual adjunct communication device control 430a-f presented by the input device visual interface 440, for instance, as a result of user selection or depression of a key or button 182 that displays an image, icon, symbol, and/or text that visually indicates or conveys an adjunct communication device configuration or control operation, a set of adjunct communication device configuration or control operations corresponding to the selected visual control 430a-f can be initiated or performed.

Depending upon embodiment details, visual content provided by the input device visual interface 440 can be duplicative or exclusive of particular visual content that is displayed or displayable by the primary visual interface 400 at one or more times. For instance, in some embodiments, particular types of primary visual interface content such as one or more visual adjunct communication device controls 430a-c directed to managing aspects of adjunct communication device configuration and/or operation can be selectively or programmably specified for duplicative display as visual adjunct communication device controls 430a-c by the input device visual interface 440. Additionally or alternatively, certain visual adjunct communication device controls 430d-f can be displayed exclusively by the input device visual interface 440 at one or more times, in a predetermined, selectable, or programmable manner.

In various embodiments, the adjunct communication device 300 can communicate, present, or output adjunct subject matter, information, signals, or data such as one or more of the following before, during, in association with, or after a user's interaction with a game such as an MMO or other type of game:
  a) Audio and/or visual information during game installation, such as portions of a game narrative or chronology;
  b) Pre-recorded messages from other users, a game manufacturer, or a third party, which can include one or more of pre-recorded audio and/or visual messages, image sequences, graphical animations, game elements, objects, or characters (e.g., user avatars), and text;
  c) Live or near-live audio and/or visual messages from other users (e.g., corresponding to a "live chat" mode), which can include one or more of live audio and/or video, game elements, objects, or characters (e.g., user avatars), and text;
  d) Notifications or reminders corresponding to messages (e.g., a new or pending message within an electronic mailbox associated with the user);
  e) Audio and/or visual information, such as particular animation sequences and/or illumination signals involving or associated with game elements, objects, or characters (e.g., the user's character avatar 402a), where such information can be presented in response to certain types of application program scenarios, situations, events, conditions, or results (e.g., game events such as a type of game battle; a game outcome such as attainment of a user performance level threshold, or a character victory, injury, or death; user acquisition of a skill or piece of equipment; or user advancement to a next game level);
  f) Visual representations of a game character associated with or of interest to the user, which can include a depiction or rendering of the game character's current outfitting (e.g., gear or armour);
  g) Visual representations of a game character's status and/or statistics;
  h) Visual representations of a game character's equipment and/or skills inventory;
  i) Visual representations of objects, equipment, or supplies available for acquisition, such as by way of an equipment armoury, supply store, or auction;
  j) Characters (e.g., character avatars 404, 406) corresponding to other players or NPCs, and possibly textual and/or audio information indicating corresponding attributes, provisions, abilities, skill level, alliance, or status;
  k) Audio and/or visual information associated with opposition groups or factions, such as faction history, status, logos, or presence;
  l) Notifications of allied or opposition character, entity, or faction presence;
  m) Alerts indicating an allied character is in danger or requires assistance;
  n) Battle or raid invitations;
  o) Audio and/or visual strategy guides or suggestions;
  p) Maps of portions of game spaces, environments, or territories, which can be dynamically, periodically, or selectively updated based upon the position or location of a character (e.g., the user's character avatar 402a) within the game;
  q) Community news information (e.g., a periodically updated community news ticker);
  r) Predetermined (e.g., as-provided by a game manufacturer) video clips, image sequences, or animation sequences corresponding to game background, strategy, scenarios, situations, level transitions, or results;
  s) Predetermined video clips or animation sequences corresponding to software upgrades or game related announcements or offers from a game manufacturer or a third party; and
  t) User screenshot presentation or management.

Additional User Interface and Adjunct Communication Device Aspects

In general, a primary user interface can include the primary visual interface 400 as well as a primary audio interface through which game related audio signals can be output in a manner that is synchronized or coordinated with visual aspects of game play. The primary audio interface can include, for example, a set of speakers 178 coupled to the computing system 100, and an associated audio subsystem (e.g., a sound card).

An adjunct user interface can include the adjunct visual interface 450 and an adjunct audio interface by which adjunct audio signals corresponding to adjunct visual information is presented or output. In several embodiments, one or more portions of an adjunct audio interface can be provided or supported by portions of the primary audio interface, such that a common or shared set of audio resources including portions of the computer's audio subsystem and a set of speakers 178 coupled thereto enable the selective or simultaneous output of primary audio information and adjunct audio information by way of a common audio pathway. The adjunct audio interface can additionally or alternatively include the adjunct communication device's set of speakers 320, which can be configured to output particular types of audio signals or information in a manner that is synchronous or asynchronous with respect to game play.

As indicated above, in some embodiments the adjunct communication device 300 includes an illumination apparatus 310, which can form a portion of the adjunct visual interface. The illumination apparatus 310 can selectively present or output illumination signals that correspond to or indicate one or more user performance levels and/or the occurrence of particular types of game related conditions or events. The illumination apparatus 310 can include a set of illumination devices 312 such as active and/or passive light sources that can be configured to selectively output illumination signals in accordance with a given set of optical wavelengths, a wavelength spectrum, and/or an illumination pattern (e.g., a spatial and/or temporal illumination pattern).

In various embodiments, in response to illumination commands generated by a game application program and/or a set of program instructions associated therewith (e.g., an add-on or plug-in to the game application program), the adjunct communication device 300 can selectively present or output illumination signals having particular visual characteristics to indicate one or more of the following:
 a) Message receipt from a player allied with the user;
 b) Message receipt from a player allied against the user (i.e., an opposition or adversarial player);
 c) A live chat request;
 d) An occurrence of a particular type of predetermined or user specifiable target event or condition corresponding to application program execution (e.g., a game event such as a danger alert or an allied player assistance request) or user attainment of a performance metric target or threshold (e.g., a target game score, a target game events per minute (EPM) threshold, or a target speed, engine RPM value, or number of competitors passed in a racing game), which can indicate or correspond to a level of user proficiency in interacting with the game;
 e) A danger level or assistance required notification;
 f) Availability of updated community news or website content; and
 g) Availability of a software or firmware upgrade.

The illumination devices 312 can include one or more optical signal generation or propagation elements or light sources such LEDs, light strips or bars, backlighting devices, light pipes, and/or optical fibers. Depending upon embodiment details, LEDs can include one or more a) single color LEDs; b) adjustable tri-color LEDs; c) OLEDs; and/or d) character LEDs, where particular types of LEDs can be spatially organized as an LED array. The illumination apparatus 310 can further include electrical circuitry (e.g., a microcontroller or driver chip) coupled to such optical signalling elements or light sources for initiating, adjusting, routing, or terminating the output or transmission of optical signals by such elements in response to illumination control commands or signals generated in association with MMO game program execution. In a representative implementation, the illumination apparatus 310 can be configured in one or more manners described in U.S. patent application Ser. No. 12/655,992, entitled "System and Method for Visually Indicating Actions per Minute Information Using Illumination," filed on 12 Jan. 2010, which is incorporated herein by reference in its entirety.

In particular embodiments, the adjunct communication device 300 further includes or is associated with a set of sensors, sensing devices, or sensing elements 330 configured to sense or detect user presence, motion, and/or gestures proximate to (e.g., in a spatial region in front of, adjacent to, and/or above) the adjunct communication device 300. The set of sensors 330 can include, for instance, one or more optical (e.g., infrared) or ultrasonic devices; and/or or one or more cameras or user image scanning or image capture devices that are carried at or relative to particular adjunct communication device positions or sites. Such sensing devices can have a predetermined, user adjustable, or automatically adjustable orientation that defines a sensing position, zone, or region with respect to a portion of the adjunct communication device 300. In response to the detection of user presence, movement, or gestures by way of the set of sensors 330, the adjunct communication device 300 can selectively perform one or more types of operations, such as the following:
 a) Activate or deactivate the adjunct display apparatus 350;
 b) Activate or deactivate the adjunct communication device speaker(s) 320;
 c) Initiate, pause, rewind, or terminate video, animation, or message presentation or playback; and
 d) Initiate, pause, or terminate live chat.

Aspects of Representative Computing System Embodiments

Figure 3:
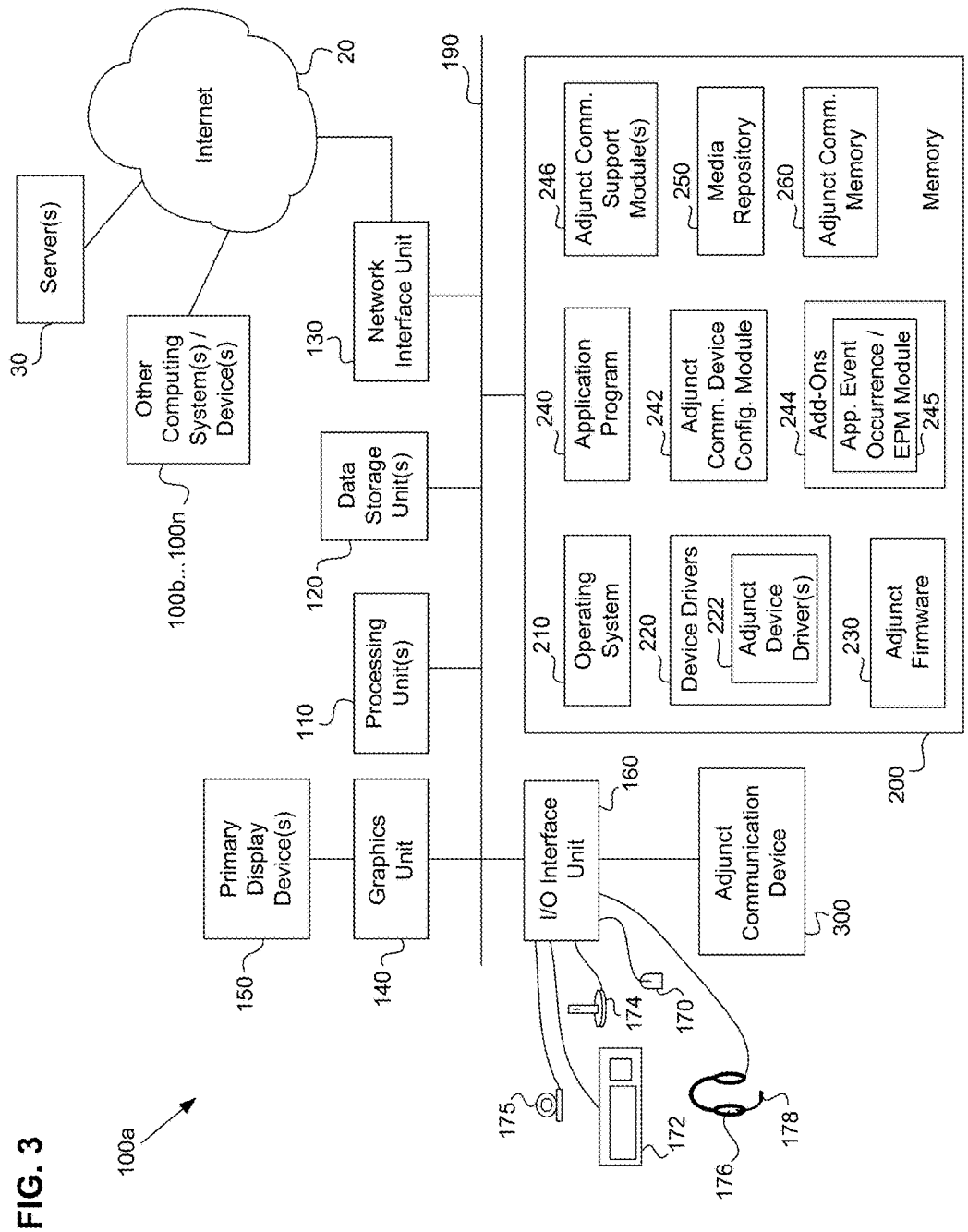
FIG. 3 is a block diagram of a computing system or computing device according to an embodiment of the disclosure.

FIG. 3 is a block diagram of a computing or electronic system or device 100 according to an embodiment of the disclosure. In an embodiment, a computing system 100 includes a processing unit 110; a set of memories 200; at least one data storage unit 120; a network interface unit 130 coupled to a computer network such as a Local Area Network (LAN), a Wide Area Network (WAN), and/or the Internet 20; a graphics unit 140 coupled to at least one primary display device 150; and an input/output (I/O) interface unit 160 coupled to an adjunct communication device 300 and a number of peripheral devices such as one or more of a mouse 170, a keyboard 172, a game control device 174 (e.g., a joystick or game pad), a video camera 175, a set of speakers 178, and a microphone 176. The peripheral device(s) can additionally or alternatively include one or more display-enabled user input apparatuses 180, such as a display-enabled keyboard, a display-enabled mouse, or a display-enabled game controller. The computing system 100 additionally includes at least one bus 190 (e.g., a PCI based bus) to which each computing system element is coupled to facilitate the communication or exchange of control signals and data.

The processing unit 110 includes one or more instruction processing devices (e.g., at least one microprocessor and/or microcontroller) capable of executing stored program instructions. The set of memories 200 includes one or more types of volatile and/or nonvolatile memory, such as a register set, one or more buffers, Random Access Memory (RAM), and Read Only Memory (ROM) configured to store program instructions and data. The data storage unit 130 includes one or more types of fixed and/or removable data storage devices or elements, as well as storage media corresponding thereto. For instance, the data storage unit 130 can include a hard disk drive, a DVD or CD-ROM drive, and/or a USB flash drive. Portions of the data storage unit 130 and/or the set of memories 200 can form one or more computer programmable or readable media on which program instruction sets that facilitate adjunct communication device operations in accordance with an embodiment of the disclosure reside.

The network interface unit 130 can include a network communication interface such as an Ethernet interface configured to operate in accordance with a standard network information transfer protocol. In several embodiments, the graphics unit 140 can include a graphics processor configured to render images or scenes (e.g., MMO game scenes) upon the primary display device 150. The I/O interface unit 160 can include a set of standard interfaces or ports such as a USB port, a serial port, and/or another type of I/O communication interface that facilitates signal transfer with input and/or output devices coupled to the computing system 100 (e.g., computing system peripheral devices), including the adjunct communication device 300. The computing system 100 can thus act as a host system with respect to the adjunct communication device 300.

In some embodiments, the computing system 100 can be a client system that communicates with one or more servers 30 or a server farm in accordance with a client-server computing architecture and corresponding client-server communication protocol. In other embodiments, one or more portions of the computing system 100 can form a cloud computing device that communicates with an application execution cloud 40. Alternatively, the computing system 100 can be a peer system that communicates with other computing systems or computing devices in accordance with a peer-to-peer computing protocol. As yet another alternative, the computing system 100 can be an isolated or stand-alone system.

In several embodiments, set of memories 200 includes an operating system 210, a set of device drivers 220, an application program 240 (e.g., a game or other type of application program, which can be a stand-alone, isolated, or non-networked program, or a networked program such as a game client), an adjunct communication device configuration module 242, a media repository 250, and an adjunct communication memory 260. The set of device drivers 220 can include at least one adjunct device driver 222 that is executable by the processing unit 110 to facilitate adjunct communication operations in accordance with particular embodiments of the present disclosure.

The set of memories 200 can further include a target application event occurrence/user performance module 245, which can manage one of more of (a) determination of whether a set of predetermined or selectable target application events, results, outcomes, conditions, scenarios, or situations has occurred; (b) determination or estimation of whether the user has satisfied a set performance metrics that indicates, corresponds, or is expected to correspond to a level of user proficiency in interacting with the application program; and (c) generation and/or transfer of signals to the adjunct communication device 300 which facilitate the provision of adjunct visual content to the user in order to indicate whether a target application program event and/or satisfaction of a performance metric has occurred. In some embodiments, one or more portions of the target application event occurrence/user performance module 245 can be provided by a set of add-ons 244.

In some embodiments, the set of memories 200 can further include an adjunct firmware memory 230. The adjunct firmware memory 230 can include firmware that is executable by the adjunct communication device 300, which when executed enables the adjunct communication device's presentation of adjunct information to the user. In certain embodiments, such firmware can be selectively or automatically downloaded to or retrieved by the adjunct communication device 300 in association with an adjunct communication device initialization process (e.g., involving a USB device enumeration process), by which the computing system 100 initially recognizes the presence, configuration, and/or capabilities of the adjunct communication device 300. Further aspects of the disclosure relating to the adjunct firmware module 230 are described in detail below.

The set of memories 200 can also include a set of adjunct communication support modules 246. In general, an adjunct communication support module 246 can include program instructions configured to support the generation, reception, or retrieval of particular types of adjunct information. In some embodiments, the adjunct communication support module(s) 246 can be associated with or include a set of application program add-ons 244, which can selectively, periodically, or intermittently receive or retrieve adjunct information from a set of local or remote adjunct information sources. An adjunct information source can be, for instance, a local data storage unit 120 and/or a server or remote database configured to store text messages, video messages, video clips or animation sequences, application program updates, and/or other information.

Adjunct communication operations can involve the management of adjunct information transfer to, the provision of adjunct information by, and/or the receipt of signals from the adjunct communication device 300 in one or more manners described herein. Depending upon embodiment details, particular adjunct communication operations can be facilitated, managed, or performed by program instructions corresponding to portions of one or more of an application program 240, an adjunct communication device configuration module 242, an add-on 244, a target game event or outcome occurrence/EPM module 245, an adjunct communication support module 246, and the adjunct device driver(s) 222.

In several embodiments, program instructions within the set of memories 200 for facilitating, managing, or performing adjunct communication operations can be defined as an adjunct communication manager. An adjunct communication manager can include program instructions corresponding to portions of one or more of an application program 240, an adjunct communication device configuration module 242, an add-on 244, and target game event occurrence/EPM module 245, an adjunct communication support module 246, and an adjunct device driver 222.

Depending upon embodiment details, portions of the set of memories 200 in which program instructions reside can be local or remote with respect to a type of computing or electronic system or device 100 under consideration. For instance, one or more portions of an application program as well as an adjunct communication manager can reside upon and be executed by a local computing system 100. Alternatively, an adjunct communication manager can reside upon and be executed by a local computing or electronic system or device 100, and one or more portions of an application program can reside upon and be executed by a remote system such as a game server or a gaming cloud that is configured for network communication with the local system. Thus, in various embodiments, one or more local and/or remote application programs in association with an adjunct communication manager automatically transfer adjunct content notifications and/or adjunct content to the adjunct communication device 300 in a manner that is responsive to a local application program execution state, a remote application program execution state, local user interaction with an application program, and/or remote user interaction with an application program.

Aspects of Representative Adjunct Communication Device Embodiments

Figure 4A:
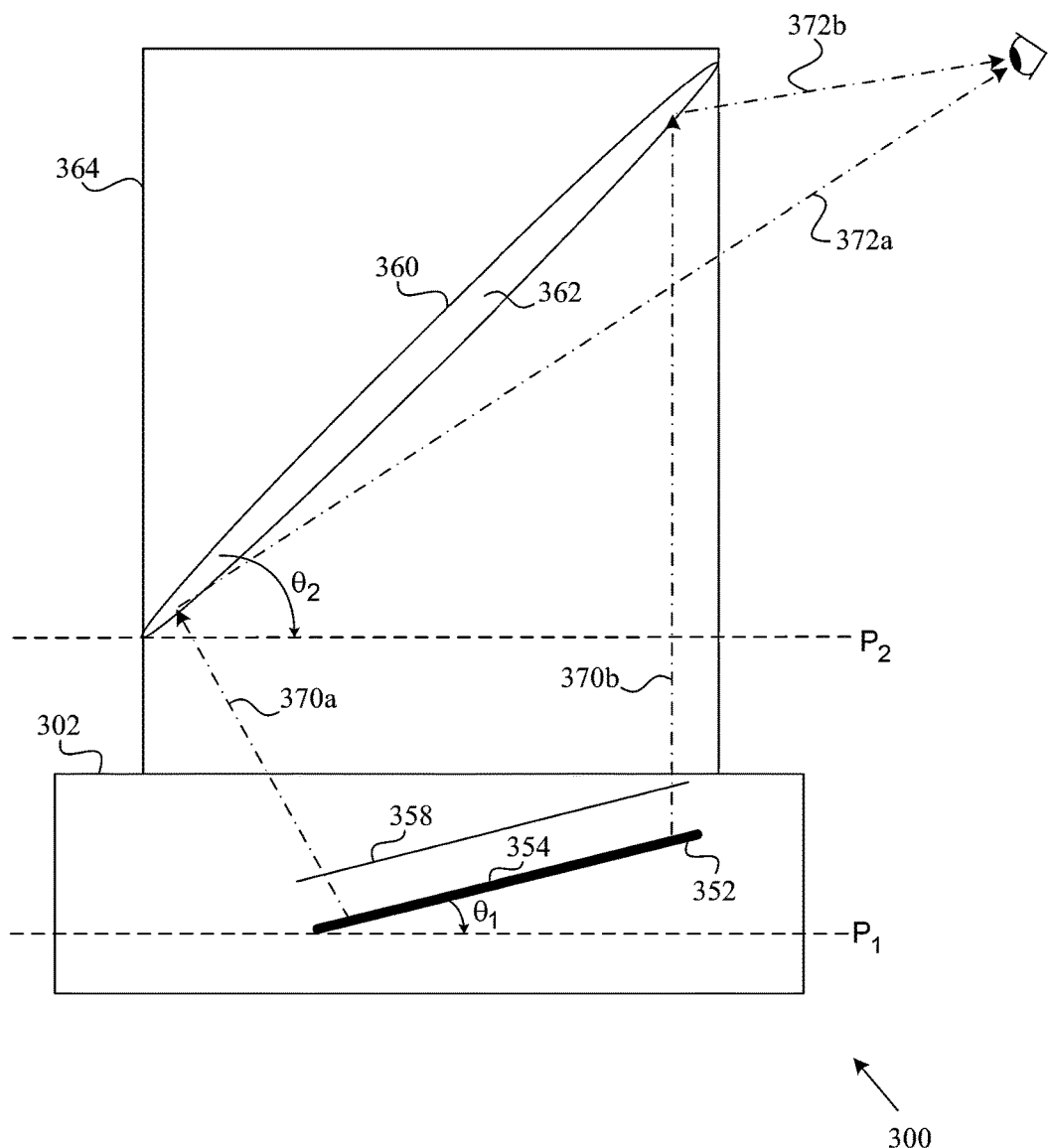
FIG. 4A is a schematic illustration of portions of an adjunct communication device according to an embodiment of the disclosure.

FIG. 4A is a schematic illustration of portions of an adjunct communication device 300 according to an embodiment of the disclosure. As indicated above, the adjunct communication device 300 can include an adjunct display apparatus 350 that is carried by a base or support structure 302. In several embodiments, the base or support structure 302 is detached or separate from or independently positionable relative to the primary display device 150. Depending upon embodiment details, an adjunct display apparatus 350 in accordance with the present disclosure can be configured to provide images having 2D and/or 3D characteristics. In several embodiments, the adjunct display apparatus 350 is configured to provide images having 3D, holographic, volumetric, quasi-3D, quasi-holographic, or quasi-volumetric characteristics.

In an embodiment, the display apparatus 350 includes a display unit, module, or device 352; a viewing screen 360; a viewing housing 364; and possibly a set of optical elements 358 disposed between the display device 352 and the viewing screen 360. The display unit 352 can include an LCD and/or other type of display element (e.g., an LED-based display, such as OLED based display, for instance, a flexible OLED) that is configured to provide, generate, or output optical signals (e.g., corresponding to adjunct visual information). The display unit 352 includes an output surface 354 that is configured to output optical signals relative to a first set of optical travel paths 370a-b extending between the output surface 354 and the viewing screen 360.

The viewing screen 360 can include a piece of material having have a viewing surface 362 that is configured to receive optical signals output by the display unit 352, and which is further configured to (re)direct at least some of such optical signals relative to a second set of optical travel paths 372a-b that provide or define a viewing angle 378 corresponding to the adjunct communication device 300. In some embodiments, the viewing screen 360 includes a sheet of polymer material, such as a polycarbonate sheet onto which optical signals output by the display unit 352 are directed or projected.

The viewing screen 360 can be at least partially reflective as a result of a reflective coating applied thereto, a reflective material incorporated therein, and/or an inherent optical property of a viewing screen material. The viewing screen 360 can have a generally rectangular, elliptical, or other type of shape, and the viewing surface 362 can be flat or curved depending upon embodiment details. In certain embodiments, the viewing screen 360 is configured to magnify images received from the display unit 352, for instance, in accordance with a predetermined magnification factor of approximately 1.1-2.5 (e.g., about 1.2-2.0).

The viewing housing 364 is configured to support portions of the viewing screen 360. In several embodiments, the viewing housing 364 surrounds or substantially surrounds portions of the viewing screen 360. For instance, the viewing housing 364 can be a cylindrical, ellipsoidal, rectangular, or otherwise shaped (e.g., polyhedral) structure, within which the viewing screen 360 can reside (e.g., one or more borders, edges, or boundaries of the viewing screen 360 can be can be mounted or adhered to one or more internal surfaces of the viewing housing 364). In embodiments in which portions of the second set of optical travel paths 372a-b extend through the viewing housing 364, appropriate portions of the viewing housing 364 should be at least generally optically transparent in order to avoid an undesirable or adverse amount of optical signal attenuation or distortion. Portions of the viewing housing 364 can accordingly be composed of a substantially transparent material such as a polymer (e.g., acrylic or another type of plastic).

The viewing housing 364 can be carried or supported by the adjunct communication device's base 302 such that the viewing housing 364 extends beyond or above the base 302. In several embodiments, portions of the viewing screen 360 can be disposed beyond or above the base 302. For instance, the viewing screen 360 can be carried by the viewing housing 364 such that the entire or substantially the entire viewing screen 360 is disposed beyond or above the base 302, in a manner shown in FIG. 4A. Additionally, portions of the display unit 352 can reside internal to the display apparatus base 302. For instance, in some embodiments the entire or substantially the entire display unit 352 is disposed internal to the base 302. Accordingly, the base 302 can include an opening 304 through which optical signals can propagate from the display unit 352 to the viewing screen 360 along the first set of optical travel paths 370a-b.

In embodiments in which the viewing screen 360 is disposed entirely or substantially entirely above the base 302 and the display unit 352 is disposed within or substantially within the base 302, an image that is directed or projected from the display unit 352 to the viewing screen 360 can appear as if it is floating in space from the perspective of an observer positioned to receive optical signals corresponding to the image along the second set of optical travel paths 372a-b. Such embodiments can thus present quasi-3D images to the user in a simple, cost effective manner.

The display unit 352 and the viewing screen 360 can be disposed at particular angles relative to each other or a set of reference planes or surfaces. For instance, the display unit 352 can be disposed at a first angle $\theta_1$ relative to a first plane $P_1$ that is parallel to a bottom surface of the base 302; and the viewing screen 360 can be disposed at a second angle $\theta_2$ relative to a second plane $P_2$ that is parallel to the first plane $P_1$. The first angle $\theta_1$ and/or second angle $\theta_2$ can be selected to support an intended viewing angle within which adjunct visual information output by the adjunct communication device can be readily perceived by the user.

A set of optical elements 358 disposed between the display unit's output surface 354 and the viewing screen 360 can include a fresnel lens or other type of element. The optical elements 358 can be configured to define or limit the viewing angle corresponding to the adjunct display device 300 by affecting or defining the extent of the first set of optical travel paths 370a-b.

Figure 4B:
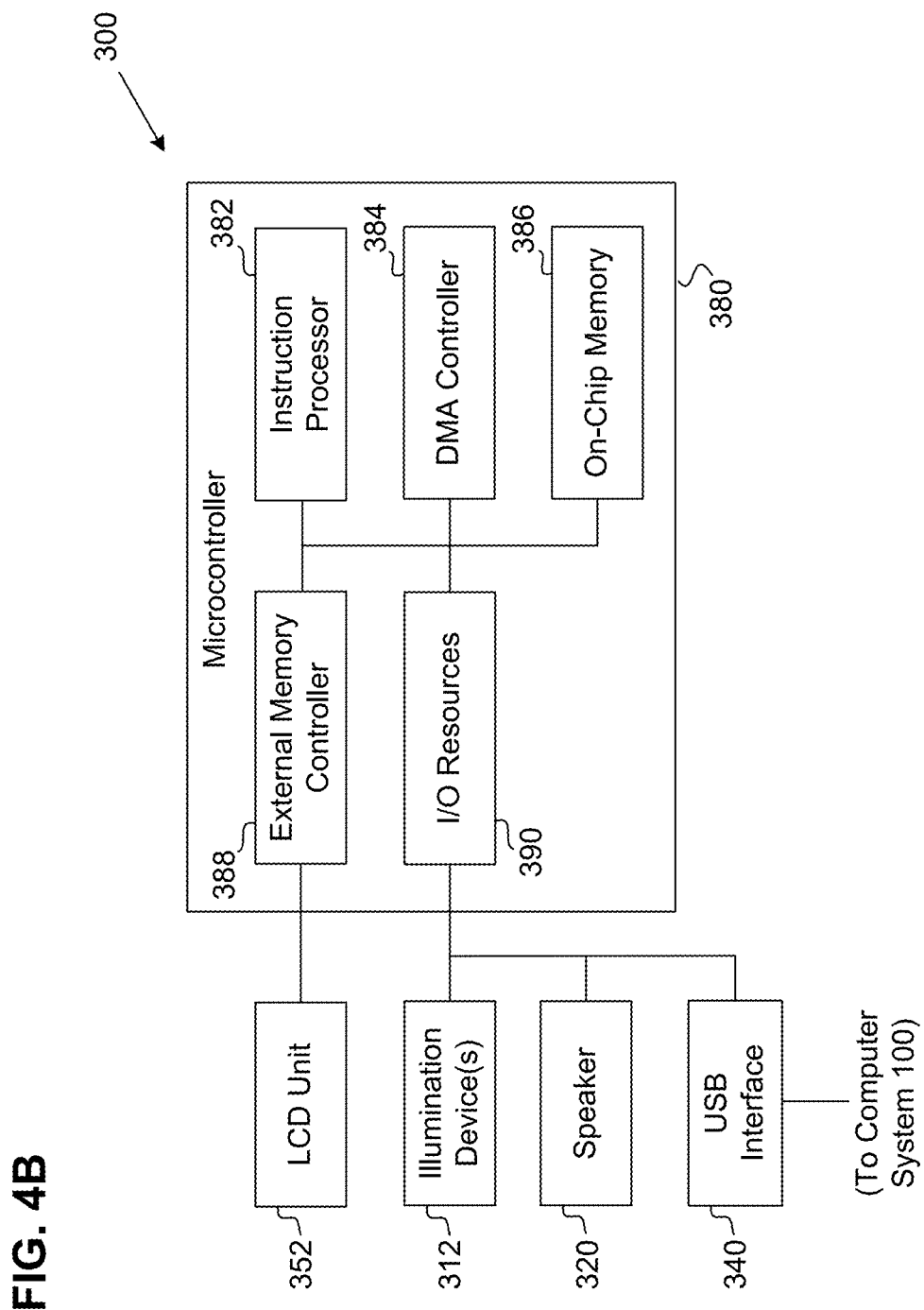
FIG. 4B is a block diagram of an adjunct communication device according to an embodiment of the disclosure.

FIG. 4B is a block diagram of an adjunct communication device 300 according to an embodiment of the disclosure. In an embodiment, the adjunct communication device 300 includes a control unit 380 that is coupled to a display unit 352, a set of illumination devices 312, a set of speakers 320, and at least one standard peripheral device interface 340 such as a USB interface. In particular embodiments, the control unit 380 includes a microcontroller configured to act as a target system or device with respect to a host computing system or computing device 100 to which the adjunct communication device 300 is couplable. Such a microcontroller can include an instruction processor 382 (e.g., a processing core), a Direct Memory Access (DMA) controller 384, an on-chip memory 386, particular display device output resources 388 such as a set of display unit output resources, and a set of I/O resources 390 (e.g., standard microcontroller peripherals). In alternate embodiments, the control unit 380 can be a microprocessor, a System on a Chip (SoC), or a configurable/programmable logic device such as a Field Programmable Gate Array (FPGA).

In certain embodiments, the display unit 352 can be an LCD unit (e.g., a memory-based LCD module that is coupled to a set of LCD output resources provided by the microcontroller 380). The set of illumination devices 312 can include one or more LEDs, light bars, or other types of devices configured to output optical signals, and which form portions of an illumination apparatus 310 carried by the adjunct communication device 300. The speaker(s) 320 can include one or more devices configured to output audio signals.

In an embodiment in which the control unit 380 includes a microcontroller and adjunct information transfer occurs by way of a USB interface 340, recognition of the adjunct communication device 300 and its capabilities by a host computing system 100 involves an adjunct communication device initialization process that includes a set of USB enumeration processes. To facilitate adjunct communication device initialization operations, the microcontroller can be configured (e.g., as part of a bootload sequence) to operate in a Device Firmware Update (DFU) mode (e.g., by executing a DFU driver that supports USB-based In-Application Programming (IAP) capabilities). In association with the set of USB enumeration processes and the microcontroller's DFU mode operation, the host computing system 100 can download a firmware image within the host computing system's adjunct firmware memory 230 to a firmware starting address within the microcontroller's on-chip memory 386. Following such firmware download, the microcontroller can transfer execution control to an initial firmware program instruction residing at the firmware starting address, after which the microcontroller can manage or perform adjunct information presentation operations in accordance with particular embodiments of the present disclosure.

In view of the foregoing, in some embodiments the control unit 380 need not include nonvolatile memory or off-chip memory in which program instructions such as adjunct communication device firmware resides. Rather, adjunct communication device firmware can be downloaded to the control unit 380 each time the adjunct communication device 300 is first recognized or initialized by the computing system 100. Such embodiments can provide a simplified, reduced cost adjunct communication device design.

Figure 4C:
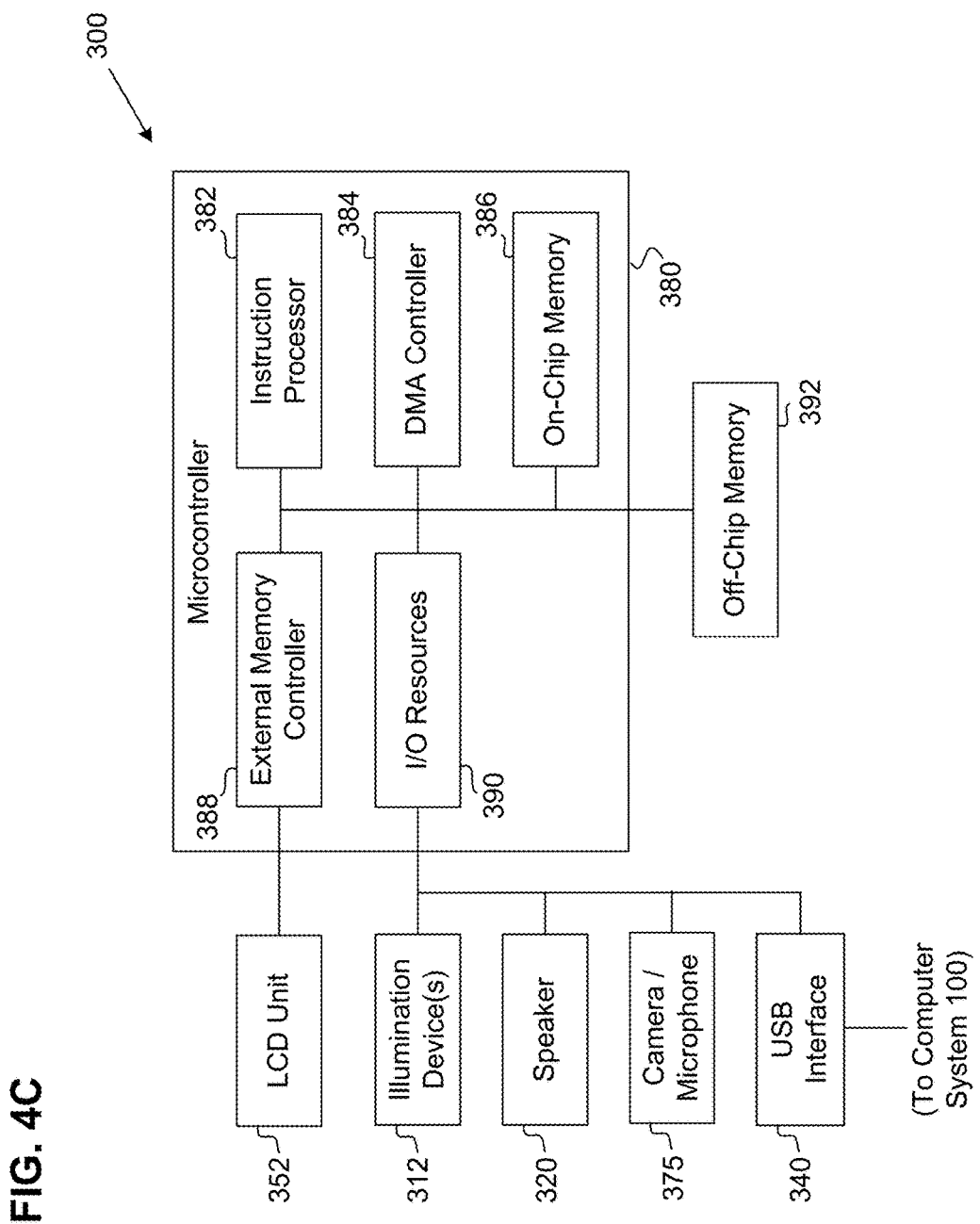
FIG. 4C is a block diagram of an adjunct communication device according to another embodiment of the disclosure.

FIG. 4C is a block diagram of an adjunct communication device 300 according to a further embodiment of the disclosure, in which the adjunct communication device 300 includes a camera 375 and possibly an associated microphone (e.g., a microphone integrated with the camera) configured to capture audio and/or visual signals (e.g., live chat audio and/or visual signals corresponding to the user) within portions of the environment surrounding the adjunct communication device 300. In some of such embodiments, the adjunct communication device 300 can include off-chip memory 392 in which captured audio and/or visual signals can reside prior to their transfer external to the adjunct communication device 300.

Aspects of User Configurable/Selectable Adjunct Communication Device Operations

A computing system 100 can include a number of adjunct communication device control elements configured to enable user management, control, specification, or selection of particular adjunct communication device operations. Such control elements can include one or more of a set of keyboard keys or buttons; one or more mouse or game controller buttons; a set of sensors 340 carried by the adjunct communication device 300; and a set of GUI elements such as graphical adjunct communication device controls 430*a-c* displayed by the primary visual interface 400 and/or graphical adjunct communication device controls 430*a-f* displayed by a display-enabled user input apparatus 180, in a manner identical, analogous, or generally analogous to that indicated in FIGS. 2A and 2B.

Graphical adjunct communication device controls 430*a-c* displayed by the primary visual interface 400 can be presented in a manner that minimally impacts the primary visual interface 400, and which minimally disrupts, overlays, or conceals information presented by the primary visual interface 400. For instance, graphical adjunct communication device controls 430*a-c* can be displayed at particular locations at the primary visual interface's periphery (e.g., on peripheral portions of an active game area). In some embodiments, one or more graphical adjunct communication device controls 430*a-f* can additionally or alternatively be displayed by portions of a display-enabled user input apparatus 180.

In some embodiments, an adjunct communication device control element can correspond to a configuration control or a content presentation control. In response to user selection of a configuration control, an adjunct communication device configuration module 242 can establish or retrieve adjunct communication device configuration parameters, and store such parameters in the adjunct communication memory 260. In response to user selection of a content presentation control, an application program 240, an add-on 244, or an adjunct communication support module 246 can initiate adjunct content transfer to the adjunct communication device 300 (e.g., in accordance with one or more configuration parameters). Representative aspects of particular adjunct communication device control elements, adjunct communication device configuration interfaces, and adjunct content presentation operations are described in detail hereafter in relation to an electronic game (e.g., an MMO game) for ease of understanding.

FIG. 2A illustrates a plurality of representative graphical adjunct communication device controls 430*a-c* that can be displayed within portions of a primary visual interface 400. As indicated in FIG. 2B, one or more graphical adjunct communication device controls 430*a-c* can additionally or alternatively be displayed by a display-enabled user input apparatus 180. In a representative embodiment, a first control 430*a* can correspond to an adjunct communication device configuration function, operation, or process; a second control 430*b* can correspond to a messaging and/or live chat function; and a third control 430*c* can correspond to a game environment map or navigational aid display function. A plurality of graphical adjunct communication device controls 430*a-f* can include control elements 430*d-f* corresponding to additional and/or other interfaces or functions depending upon embodiment details.

Aspects of Adjunct Communication Device Configuration

In response to user selection of the first control 430*a*, the adjunct communication device configuration module 242 can generate a visual or graphical configuration interface that is displayed within or overlaid upon portions of the primary visual interface 400. Such an interface includes a set of graphical elements that are responsive to user input for defining or selecting adjunct communication device configuration parameters, in accordance with which the application program 240, an add-on 244, and/or an adjunct communication support module 246, and the adjunct communication device 300 operate to provide or present adjunct information to the user.

FIG. 5A is a schematic illustration of a representative adjunct communication device configuration interface 500 according to an embodiment of the disclosure. In an embodiment, the adjunct communication device configuration interface 500 includes a graphical window 510 that displays a number of textual descriptors and associated graphical control elements such as radio buttons 520, push buttons 530, and text or list boxes 540. In a representative embodiment such as that shown in FIG. 5A, the configuration interface 500 can include a number of enabled content controls such as radio buttons 520 responsive to user input for establishing adjunct content presentation parameters that selectively enable or facilitate the control of the adjunct communication device's presentation of adjunct content that can include one or more of the following:

a) Messaging/live chat content, which can include text messages, sets of images, video messages, and/or streaming video;
b) Automatically selected content, which can include video clips, animations, or image sequences that an application program 240 such as a game application automatically selects for presentation in response to one or more predetermined game events, results, outcomes, conditions, scenarios, or situations such as a user transition to a new or next game level;
c) Information corresponding to a game element, object, or character, for instance, status and/or capability information corresponding to a user selected character (e.g., an avatar 402-406 or NPC), where such information can include text and possibly a visual representation of the game element, object, or character;
d) Map and/or navigational aid content, including user selectable presentation of game environment maps, and one or more navigational aids such as a navigation arrow;
e) Character related feedback (e.g., related to a game character such as an avatar 402-406 or NPC), including visual animation sequences that are presented in response to the occurrence of particular types of in-game events or conditions, such as user success in a game battle, user acquisition of an object or skill, or an avatar energy level reaching one or more levels (e.g., a critical low energy threshold, or a peak energy level); and
f) Notifications corresponding to the occurrence of particular types of target game events or outcomes, or user attainment of a one or more EPM thresholds corresponding to user performance or user skill level.

The configuration interface 500 can also include one or more graphical push buttons 530 such as a push button 530a responsive to user input for identifying or selecting one or more animation sequences corresponding to one or more game characters such as a user's avatar 402 (e.g., where such animation sequences can reside on the data storage unit 120, such that the adjunct communication device configuration module 242 can transfer an animation sequence to the media repository 250 following user selection of the animation sequence); and/or a push button 530b responsive to user input for establishing target game event occurrence and/or EPM parameters by way of a related, secondary, or additional configuration interface.

Figure 5B:
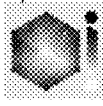
FIG. 5B is a schematic illustration of a representative target application event occurrence and/or events per minute (EPM) configuration interface according to an embodiment of the disclosure.

FIG. 5B is a schematic illustration of a representative target application event, outcome, result, condition, scenario, or situation occurrence and/or EPM configuration interface 600 according to an embodiment of the disclosure. In an embodiment, the configuration interface 600 includes a graphical window 610 that provides a number of GUI elements that facilitate user configuration of particular game event occurrence and/or EPM parameters.

In a representative embodiment, a configuration interface 600 can include a set of text boxes 620a-e that can receive user input for defining a set of target values or thresholds for particular types of game events, results, or conditions, such as a first cumulative enemy dispatch target; a second cumulative enemy dispatch target; an average number of enemies dispatched per battle target; a melee strike effectiveness target; an input device EPM threshold; and/or other targets or thresholds. The configuration interface 600 can further include a set of check boxes 622 responsive to user input for identifying a set of input devices (e.g., a keyboard, mouse, and/or game controller or joystick) for which EPM data is to be calculated, determined, or monitored.

The configuration interface 600 can further include a set of color selection interfaces 630a-e responsive to user input for establishing an illumination color corresponding to each target game event and/or EPM threshold; and optionally a set of illumination effect radio buttons 640a-e responsive to user input for defining an illumination effect such as strobing or fading corresponding to each target game event or EPM threshold.

As further indicated in FIG. 5A, the configuration interface 500 can additionally include a set of graphical controls such as radio buttons 520 responsive to user input for configuring a manner in which adjunct content notifications or alerts are provided or presented. For instance, in response to user selection of a radio button 520 corresponding to "constant illumination," adjunct content notifications can presented to the user by way of constant or unchanging optical signals (e.g., which are output by a portion of the illumination apparatus 310 in response to the adjunct communication device's receipt of an adjunct content notification or alert). In response to user selection of a radio button 520 corresponding to "blinking," adjunct content notifications can be presented to the user by way of blinking or flashing optical signals. The configuration interface 500 can further include a set of text or list boxes 540a,b responsive to user input that specifies a number of times the user is to be notified of adjunct content existence or availability within a given time period. For instance, following the generation of an adjunct content notification, one or more illumination devices 312 can blink 5 times every 60 seconds to notify the user that adjunct content is available for user selection and viewing.

The configuration interface 500 can further include one or more graphical controls such as radio buttons 520 responsive to user input for selecting a set of operations that can be performed in response to signals generated by the adjunct communication device sensor(s) 330. Such operations can include selectively transitioning or toggling the operating state of the adjunct communication device 300 (e.g., to an on, standby, or off state) in response to the detection of user proximity, presence, motion, or gestures by a first set of sensors 330; and/or controlling message, video, or animation playback (e.g., pausing, restarting, rewinding, and/or terminating playback) in response to the detection of user proximity, presence, motion, or gestures motion by a second set of sensors 330.

As indicated above, adjunct communication device parameters can be stored in the adjunct communication memory 260. In a number of embodiments, an application program 240 can automatically retrieve or reference a default or most recent set of adjunct communication device parameters in association with an adjunct communication device initialization process, or following a most recent change or update to adjunct communication device parameters (e.g., as a result of user interaction with a configuration interface 500).

In several embodiments, user selection or activation of a given configuration interface control corresponding to a particular type of visual content will result in the presentation of such visual content by way of the adjunct visual interface 450. As a result, in response to user input, an adjunct communication manager can selectively determine or specify what type(s) of visual content should be omitted or excluded from the primary visual interface 400 and/or (re)directed to the adjunct visual interface 450. In such embodiments, the configuration interface 500 facilitates user customization of primary and adjunct or secondary visual interface content, such that the user can selectively reduce or eliminate undesirable primary visual interface clutter and/or increase or maximize an extent to which portions of the primary visual interface can present or provide dynamically or progressively updated game content. In some embodiments, based upon user input directed to a configuration interface 500, an application program or a related set of program instructions (e.g., an add-on 244 or an adjunct communication support module 246) can adaptively adjust or determine an amount of primary visual content or a level of primary visual interface detail that is conveyed or conveyable to the user during application program execution. In certain embodiments, user non-selection, de-selection, or deactivation of a given enabled content graphical control within an adjunct communication device configuration interface 500 will result in the presentation of adjunct visual content corresponding to the graphical control using the primary display device 150.

Aspects of Adjunct Information Presentation

An application program 240, an add-on 244, a target application event occurrence/user performance module 245, and/or an adjunct communication support module 246 can initiate or manage the transfer of adjunct information to the adjunct communication device 300. Adjunct information can include adjunct content or adjunct content notifications/alerts, where adjunct content can include adjunct visual content and/or adjunct audio content. In several embodiments, adjunct audio content corresponding to adjunct visual content is presented to the user by way of a primary audio interface, and is synchronized to the presentation of the adjunct communication device's display of such adjunct visual content. Adjunct audio content can additionally or alternatively be presented to the user using portions of an adjunct audio interface such as the adjunct communication device's speaker(s) 320. Adjunct content notifications or alerts can include messages or signals that notify the user that adjunct content is available or selectable for presentation.

Particular low or lower level aspects of computing system—adjunct communication device data or signal transfer can be managed or controlled by an adjunct device driver 222. For instance, the adjunct communication driver 222 can appropriately organize or format adjunct content such as video or animation data, and store it in the adjunct communication memory 260. The adjunct device driver 222 can communicate with the adjunct communication device 300 to facilitate the transfer of organized adjunct content to the adjunct communication device 300, and corresponding adjunct content display. In some embodiments, the adjunct device driver 222 can capture an entire frame of data (e.g., from a frame buffer); organize (e.g., packetize) captured data in accordance with a format suitable for a given communication interface (e.g., a USB interface); store the organized data in the adjunct communication memory 260; and direct the adjunct communication device 300 to retrieve and display such data, for instance, by way of DMA operations.

Aspects of a Representative Adjunct Communication Device Data Transfer Protocol

In various embodiments, one or more types of adjunct content can be acquired or retrieved from a local host computer, a gaming cloud, a game server, and/or a remote database. Acquired or retrieved adjunct content can be processed by the local host computer or a local cloud gaming device, such that RGB format adjunct visual content is generated within or transferred to a local memory (e.g., a video memory such as a frame buffer) corresponding to the local host computer or cloud gaming device, respectively. The contents of the local memory can be read segment by segment and DMA transferred directly to the adjunct communication device's adjunct display apparatus 350.

In embodiments in which the adjunct communication device's control unit 380 includes or is implemented using a microcontroller, such direct DMA transfer avoids the need for storing incoming adjunct visual content within an off-chip memory, thus eliminating the need for a codec and a frame buffer (and possibly off-chip memory itself) on the adjunct communication device 300 for handling incoming adjunct visual content. Additionally, such embodiments significantly reduce or minimize the amount of microcontroller resources needed to provide adjunct communication device functionality, and require no corresponding application space. Such embodiments can thus utilize a simple or inexpensive microcontroller, and/or enable the use of microcontroller resources for handling other tasks (e.g., acquiring or processing sensed environmental signals).

Aspects of Adjunct Content and/or Adjunct Content Notification Transfer

In various embodiments, adjunct content or adjunct content notifications can be transferred to the adjunct communication device 300 in response to the occurrence of particular types of adjunct content events. In general, adjunct content events can correspond to deferrable adjunct content or immediate adjunct content. Deferrable adjunct content includes audio and/or visual content for which presentation can be delayed until user input requesting presentation of such content is generated or received. For instance, deferrable adjunct content can include newly, recently, or previously received and yet-to-be-presented content such as one or more pre-recorded audio and/or visual messages received from other users; requests for live chat sessions; or messages relating to software upgrades, third party add-ons, website content updates, online community news, or other types of messages.

Immediate adjunct content includes audio and/or visual content for which immediate, ongoing, or continuous presentation to the user is required or desired, either in response to a) an adjunct input event corresponding to user input requesting adjunct content presentation; and/or b) an automatic adjunct content event arising from application program or add-on instruction execution. An adjunct input event can be generated in response to particular types of user input, such as user selection of a graphical control within the primary visual interface 400, user selection of a keyboard key or key sequence, or user motion detected by a particular sensor 330 carried by the adjunct communication device 300.

A representative example is considered hereafter with reference to FIGS. 2A and/or 2B, in which a) the primary visual interface 400 displays a set of graphical adjunct communication device controls 430*a-c* including a second control 430*b* correspond to a messaging and/or live chat function, and a third control 430*c* corresponding to a map presentation/navigation function; and b) the adjunct communication device 300 includes at least one illumination device 330 configured to output optical signals in a manner that indicates the existence of pending messages or live chat requests, and possibly further includes a sensor 330 configured to detect user input corresponding to user motion.

An application program 240 such as a game client or an associated add-on 244 can inform the user of the existence or availability of deferrable adjunct content by generating a set of corresponding notifications or alerts directed to the primary user interface and/or the adjunct user interface. More particularly, in response to one or more recently arrived or previously arrived and currently pending pre-recorded messages or live chat requests, an application program 240 can generate an adjunct content notification directed to the primary visual interface 400 to cause the primary visual interface 400 and/or a display-enabled user input apparatus 180 to change a manner in which the second control 430*b* is displayed, for instance, by altering or varying the appearance of the second control 430*b* (e.g., by way of periodic flashing or color variation). Additionally or alternatively, the application program 240 can generate an adjunct content notification directed to the adjunct communication device 300 to cause one or more illumination devices 312 carried by the illumination apparatus 310 to output optical signals indicating that pending messages or live chat requests exist.

If a pending message or a live chat request exists, in response to user selection of the second control 430*b* (e.g., by way of a mouse click, or user selection of an appropriate display-enabled key or button 182 of a display-enabled user input apparatus 180), the application program 240 or an associated add-on 244 can retrieve or access message or live chat image data (e.g., which can be stored in the media repository 250 or the adjunct communication memory 260), and initiate the transfer of such image data to the adjunct communication device 300. The adjunct communication device 300 can correspondingly display a set or sequence of message or live chat images in a manner that avoids disrupting, overlaying, or concealing information presented by the primary visual interface 400. In various embodiments, the application 240 or an add-on 244 can output message or live chat audio signals by way of the primary audio interface in a manner that is synchronized to the adjunct communication device's presentation of message or live chat images. Specific messaging functions such as pause, resume, fast forward, rewind, or delete can be implemented by way of additional control elements, such as particular keys or buttons carried by a keyboard, graphical elements displayed by the primary visual interface 400, and/or sensors carried by the adjunct communication device 300.

In some embodiments, in response to user selection of the second control 430*b*, the application program 240 or an associated add-on 244 can generate and display a message selection interface (e.g., a graphical menu of messages) that identifies or lists pending and/or previously presented messages available for user selection. Depending upon embodiment details, the message selection interface can be presented by portions of the primary visual interface 400, the adjunct visual interface, and/or an input device visual interface 440 (for instance, portions of a message selection interface can be displayed by an LCD or OLED device 184 of a display-enabled user input apparatus 180). In response to user selection of a pending or previously presented message, the application program 240 or add-on 244 can retrieve or access data corresponding to the selected message, and initiate the transfer of such message data to the adjunct communication device 300. Depending upon embodiment details, such message data can be stored upon and retrieved from a remote source (e.g., a server) or a local source (e.g., the data storage unit 120 or the set of memories 200). The adjunct communication device 300 can subsequently output adjunct audio and/or visual information, signals, or data corresponding to the contents of the selected message.

In some embodiments once application program execution has been initiated and the application program 240 has generated portions of the primary visual interface, a game related application program 240 or an associated add-on 244 can mange or direct the identification, retrieval, and presentation of adjunct audio and/or visual content to the user regardless of whether game play is underway. In such embodiments, the adjunct communication device 300 can present adjunct content to the user during or outside of game play. For instance, the adjunct communication device 300 can present adjunct message content to the user in a manner identical or analogous to that described above when game play is underway, when game play has yet to begin or resume, and/or following a game session.

Additionally or alternatively, an application program 240 or an associated add-on 244 can manage or direct the identification, retrieval, and presentation of adjunct audio and/or visual content in 1) an on-line mode in which remote adjunct content can be received from a remote source (e.g., by way of network communication); and/or 2) an off-line mode in which local adjunct content stored on the data storage unit 120 and/or within a portion of the set of memories 200 can be retrieved.

In response to user selection of the third control 430*c*, the game client 240 or an associated add-on 244 can determine or retrieve a user's virtual location with respect to a current game space or environment; identify and retrieve a corresponding game space or environment map (e.g., from a local or remote database) based upon the user's virtual location; and initiate the transfer image data corresponding to the map to the adjunct communication device 300. The adjunct communication device 300 can display the map image data, which can remain displayed as the user continues game play in a manner that avoids disrupting, overlaying, or concealing information presented by the primary visual interface 400. In certain embodiments, the game client 240 or an add-on 244 can (re)determine the user's virtual location with respect to the map or a map region at one or more times (e.g., on an automatic basis, or in response to subsequent user selection of the third control 430*c*), and transfer updated map data to the adjunct communication device 300 based upon changes in the user's virtual location. The game client 240 or add-on 244 can terminate the adjunct communication device's map display operations in response to a predetermined type of user input, for instance, a double click or double finger tap on the third control 430c, or user a movement or gesture detected by the adjunct communication device's sensor(s) 330.

In addition to the foregoing, a game client 240 can automatically select or identify adjunct content that is to be directly presented to the user, and generate an automatic adjunct content event as a result of a given execution state, situation, or condition. For instance, if the user has successfully transitioned to a next game level or environment, the game client 240 can automatically identify a video or animation sequence (e.g., portions of which reside on the data storage unit 120 or within the media repository 250) that provides information (e.g., a story narrative, or strategic objectives) relating to the game level or environment under consideration, and generate a corresponding automatic adjunct content event to initiate the transfer of the video or animation sequence to the adjunct communication device 300 and the presentation of such adjunct visual content to the user.

As indicated above, an add-on 244 can also automatically select, identify, or generate adjunct content that is to be directly or immediately presented to the user. For instance, a target game event occurrence/user performance module 245 can monitor or determine whether a target game event has occurred, and/or monitor or determine a current or most recent user EPM count, and generate an appropriate automatic adjunct content event directed to the adjunct communication device 300 when the target game event has occurred and/or or the current EPM count satisfies an EPM threshold condition (e.g., as specified by a configuration interface 600 such as that described above). Such an automatic adjunct content event can include a set of adjunct communication device commands or instructions, such as one or more illumination commands that direct the adjunct communication device 300 to present or output illumination signals (e.g., by way of activating or adjusting the output of particular illumination devices 312) in a manner that corresponds to the occurrence of the target game event and/or satisfaction of the EPM threshold condition.

Aspects of Representative Adjunct Communication Device Processes

Figure 6:
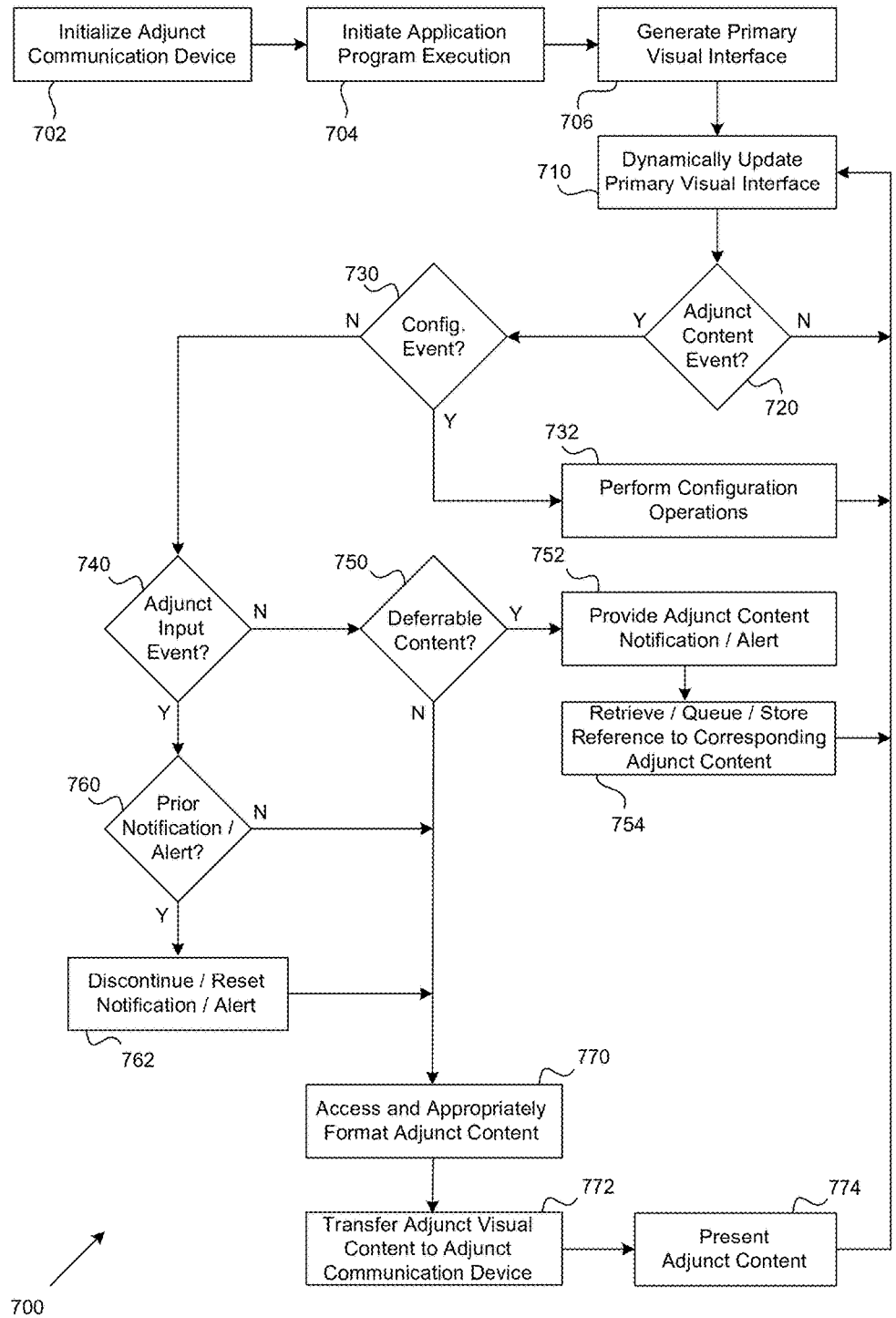
FIG. 6 is a flow diagram of an adjunct information presentation process according to an embodiment of the disclosure.

FIG. 6 is a flow diagram of an adjunct information presentation process 700 according to an embodiment of the disclosure. In an embodiment, the process 700 includes a first process portion 702 involving the computing system's initialization of an adjunct communication device 300, such as by way of an enumeration process that occurs in response to a user establishing an active communication link between the adjunct communication device 300 and the computing system 100 (e.g., by way of a plug-in USB coupling). A second process portion 704 involves the initiation of application program execution on the computing system 100. A third process portion 706 involves the application program's generation or presentation of portions of a primary visual interface 400 on the primary display device 150, and possibly the generation or presentation of portions of an input device visual interface 440 on a display-enabled user input apparatus 180. A fourth process portion 710 involves the application program's dynamic or progressive updating of portions of the primary visual interface 400 and possibly portions of an input device visual interface 440, which can be based upon application program execution state and/or the evolution of application program context. Depending upon embodiment details, the evolution of application program context can occur in response to local user input and/or communication received from a remote server 30 (e.g., in response to remote user input directed to or processed by the server 30).

A fifth process portion 720 involves determining whether a new or next adjunct content related event requires consideration. If not, the process 700 can return to the fourth process portion 710. If a new or next adjunct content related event requires consideration, a sixth process portion 730 involves determining whether the adjunct content related event under consideration corresponds to an adjunct communication device configuration event. If so, a seventh process portion 732 involves performing adjunct communication device configuration operations.

If the adjunct content related event is other than an adjunct communication device configuration event, an eighth process portion 740 involves determining whether the adjunct content related event under consideration corresponds to an adjunct input event associated with a user request for adjunct content presentation. If not, a ninth process portion 750 involves determining whether the adjunct content event corresponds to deferrable content, or content that requires immediate, essentially immediate, or continued presentation to the user.

If the adjunct content event corresponds to deferrable content, a tenth process portion 752 involves generating and providing an adjunct content notification or alert by way of one or more of the primary user interface (e.g., the primary visual interface 400), the adjunct user interface (e.g., the adjunct visual interface 450), and an input device visual interface 440, thereby informing the user of the presence or availability of new or pending user selectable adjunct content. An eleventh process portion 754 involves retrieving, queuing, or storing a reference to the deferrable adjunct content. Following the eleventh process portion 754, the process 700 can return to the fourth process portion 710.

If in association with the eighth process portion 740 an adjunct content related event under consideration is an adjunct input event indicating user selection of particular adjunct content, a twelfth process portion 760 involves determining whether a prior adjunct content notification or alert corresponding to the particular adjunct content has been generated. If so, a thirteenth process portion 762 involves discontinuing or resetting the adjunct content notification.

Following the thirteenth process portion 762, or after the ninth process portion 750 in the event that an immediate adjunct content event has occurred, a fourteenth process portion 770 involves accessing (e.g., retrieving or downloading) and appropriately formatting adjunct content under consideration, and a fifteenth process portion 772 involves transferring at least adjunct visual content to the adjunct communication device 300. The fifteenth process portion 772 can also involve transferring adjunct audio content to the primary audio interface and/or the adjunct audio interface, for instance, in a manner that enables synchronization with the presentation of adjunct visual content by the adjunct communication device 300. Finally, a sixteenth process portion 774 involves presenting adjunct content to the user using the adjunct communication device 300, after which the process 700 can return to the fourth process portion 710.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

What is claimed is:

1. A method for providing a user with a visual environment corresponding to an application program by way of a computing system comprising an adjunct communication device configured to provide an adjunct visual interface, the adjunct communication device separate from a primary display device, the method comprising:
  detecting an adjunct content event corresponding to adjunct visual content associated with an aspect of the application program;
  selectively transferring one of an adjunct content notification and adjunct visual content to the adjunct communication device in response to an adjunct content event,
  wherein the adjunct content event corresponds to one of an application program installation sequence, an occurrence of an application program event, an indication of user proficiency in interacting with the application program, a communication session with a remote system, and a predefined visual sequence that includes one of video data and animation data that is automatically selected for presentation to the user during one of application program installation and application program execution,
  wherein the adjunct communication device comprises a housing, a base, a display unit at least partially residing in the base and a viewing screen mounted within the housing, wherein the viewing screen comprises a viewing surface, wherein the display unit comprises an output surface;
  outputting optical signals relative to a first set of optical travel paths using the output surface;
  receiving the optical signals using the viewing surface; and
  at least partially directing the optical signals relative to a second set of optical travel paths, wherein the second set of optical travel paths defines a viewing angle;
  wherein the viewing surface is disposed at an acute angle relative to the output surface;
  wherein the viewing surface is slanted towards the viewing angle;
  wherein the viewing screen is reflective; and
  wherein the viewing surface is curved.

2. The method of claim 1, further comprising:
  retrieving adjunct visual content from at least one of a cloud computing system, a remote server, a remote database, and a local media repository; and
  presenting adjunct visual content using the adjunct visual interface.

3. The method of claim 1, wherein selectively transferring adjunct visual content to the adjunct communication device comprises performing a direct memory access (DMA) transfer of adjunct visual content from the computing system to the adjunct communication device.

4. The method of claim 1, further comprising:
  generating primary visual content on an ongoing basis during application program execution, the primary visual content corresponding to a current application program execution state; and
  outputting primary visual content to the primary display device.

5. The method of claim 4, wherein the primary visual content provides a main source of visual information for user interaction with the application program.

6. The method of claim 4, wherein outputting primary visual content to the primary display device on an ongoing basis occurs in a substantially uninterrupted manner during transferring adjunct visual content to the adjunct communication device.

7. The method of claim 1, wherein the adjunct visual content includes first adjunct visual content, the method further comprising:
  presenting the first adjunct visual content using the adjunct communication device; and
  avoiding the presentation of the first adjunct visual content by the primary display device.

8. The method of claim 7, further comprising increasing an extent to which the primary display device presents primary visual content as a result of avoiding the presentation of the first adjunct visual content by the primary display device.

9. The method of claim 8, wherein increasing an extent to which the primary display device presents primary visual content comprises increasing at least one of an amount of visual information and an amount of visual detail presented by the primary display device.

10. The method of claim 1, wherein the adjunct communication device comprises an adjunct display apparatus configured to present images corresponding to at least two spatial dimensions, and wherein the method further comprises presenting adjunct visual content corresponding to at least two spatial dimensions using the adjunct display apparatus.

11. The method of claim 1, wherein the adjunct communication device comprises an adjunct display apparatus configured to generate images having one of 3D and quasi-3D characteristics, and wherein the method further comprises presenting adjunct visual content having one of 3D and quasi-3D characteristics using the adjunct display apparatus.

12. The method of claim 1, wherein the adjunct content event selectively corresponds to visual content for essentially immediate presentation or deferred presentation to the user.

13. The method of claim 1, wherein the adjunct content event corresponds to user selection of a graphical control displayed by one of the primary display device and a display-enabled user input apparatus that is separate from the adjunct communication device.

14. The method of claim 1, wherein the adjunct content event corresponds to an automatic determination of a user location relative to a visual navigational aid.

15. The method of claim 1, wherein the adjunct visual content includes a set of predefined visual sequences, and wherein each predefined visual sequence within the set of predefined visual sequences corresponds to a predetermined type of application program outcome corresponding to user interaction with the application program.

16. The method of claim 1, wherein a communication session with the remote system corresponds to communication of one of a pre-recorded message and a request for a live chat session.

17. The method of claim 16, wherein the pre-recorded message corresponds to one of a message from a remote user associated with the remote system, an application program upgrade, and an add-on to the application program.

18. The method of claim 1, further comprising:
  receiving a communication from the remote system; and
  generating an adjunct communication notification in response to the communication received from the remote system.

19. The method of claim 18, further comprising presenting adjunct visual content using the adjunct communication device while the computing system is in an online mode in which network communication can occur.

20. The method of claim 18, further comprising presenting adjunct visual content using the adjunct communication device while the computing system is in an offline mode in which network communication does not occur.

21. The method of claim 18, wherein generating an adjunct communication notification comprises changing a display state of a graphical element displayed by one of the primary display device and a display-enabled user input apparatus separate from the adjunct communication device.

22. The method of claim 1, wherein the adjunct communication device carries an illumination apparatus, and wherein the method further comprises changing an illumination state of the illumination apparatus in a manner that corresponds to the adjunct content event.

23. The method of claim 22, wherein changing an illumination state of the illumination apparatus comprises selectively generating optical signals in a manner that provides an indication of one of an occurrence of a predetermined application program event and a level of user proficiency in interacting with the application program.

24. The method of claim 1, wherein the adjunct communication device carries a set of adjunct input devices configured to detect input from the user, and wherein the adjunct content event corresponds to a signal generated by an adjunct input device within the set of adjunct input devices.

25. The method of claim 24, wherein the set of adjunct input devices comprises a set of sensors configured to detect one of user proximity, user presence, user motion, and user gestures in a spatial region proximate to the adjunct communication device.

26. The method of claim 1, wherein the application program comprises an electronic game.

27. The method of claim 26, wherein the application program corresponds to at least one of a strategy game, a tactical game, an adventure game, a visual novel, an interactive movie, an action-adventure game, a role playing game, a navigation game, a combat game, a first person game, a third person game, a vehicular game, an educational game, a training game, a simulation game, a maze game, a puzzle game, a trivia game, a board game, a card game, a gambling game, a music game, a dance game, a sports game, an exercise game, and a party game.

28. The method of claim 26, wherein the application program corresponds to one from the group of a single user game and an interactive game.

29. The method of claim 26, wherein the application program corresponds to an MMO game.

30. The method of claim 15 further comprising:
determining whether a first predetermined type of application program outcome within a set of predetermined types of application program outcomes has occurred during application program execution; and
transferring a first predefined visual sequence within the set of predefined visual sequences to the adjunct communication device in response to occurrence of the first predetermined type of application program outcome.

31. The method of claim 30, wherein the first predetermined type of application program outcome corresponds to an electronic game event.

32. The method of claim 31, wherein the electronic game event corresponds to one of user transition to a next game level, user interaction with a non-player character, and user interaction with a remote user.

33. The method of claim 1, further comprising generating an adjunct communication device configuration interface that includes a set of graphical controls responsive to user input for selectively defining types of visual information as adjunct visual content to be transferred to the adjunct communication device.

34. The method of claim 33, further comprising determining at least one of an amount of visual information and an amount of visual detail within the primary visual content based upon user input directed to the adjunct communication device configuration interface.

35. The method of claim 1, further comprising avoiding the transfer of adjunct visual content to the adjunct communication device in the absence of an initialization process by which the computing system recognizes the adjunct communication device.

36. The method of claim 35, further comprising outputting adjunct visual content to the primary display device rather than transferring adjunct visual content to the adjunct communication device in the absence of an initialization process by which the computing system recognizes the adjunct communication device.

37. The method of claim 1, further comprising performing a set of adjunct communication device initialization operations in response to an initial detection of a coupling that enables signal communication between the processing unit and the adjunct communication device, wherein the set of adjunct communication device initialization operations includes automatically transferring adjunct communication device firmware from the memory to the adjunct communication device.

38. The method of claim 37, wherein performing a set of adjunct communication initialization operations occurs in association with a peripheral device enumeration process.

39. A system for providing a user with a visual environment corresponding to an application program, the visual environment comprising a primary visual interface and an adjunct visual interface, the primary visual interface providing a main source of visual information for user interaction with the application program, the system comprising:
an adjunct communication device separate from a primary display device and couplable to a processing unit, the adjunct communication device comprising:
a housing;
a base;
a display unit at least partially residing in the base, the display unit comprising an output surface, the output surface configured to output optical signals relative to a first set of optical travel paths; and
a viewing screen mounted within the housing, the viewing screen comprising a viewing surface, the viewing surface configured to receive the optical signals, and further configured to at least partially direct the optical signals relative to a second set of optical travel paths, wherein the second set of optical travel paths defines a viewing angle;
wherein the viewing screen is reflective;
wherein the viewing surface is disposed at an acute angle relative to the output surface;
wherein the viewing surface is slanted towards the viewing angle; and
wherein the viewing surface is curved; and
an adjunct communication manager configured to manage adjunct communication operations comprising:
determining whether an adjunct content event has occurred; and selectively transferring one from the group of an adjunct content notification and adjunct visual content to the adjunct communication device in response to the occurrence of an adjunct content event,
wherein the adjunct content event corresponds to one of an application program installation sequence, an occurrence of an application program event, an indication of a level of user proficiency in interacting with the application program, a communication session with a remote system, and a predefined visual sequence that includes one of video data and animation data that is automatically selected for presentation to the user during one of application program installation and application program execution.

40. The system of claim 1, further comprising at least one of a local adjunct information source and a remote adjunct information source.

41. The system of claim 39, wherein the portion of the application program and the adjunct communication manager are each executed by a local computing system.

42. The system of claim 39, wherein the adjunct communication manager is executed by a local computing system and the portion of the application program is executed by a remote computing system configured for network communication with the local computing system.

43. The system of claim 39, wherein the display apparatus of the adjunct communication device is configured to output images having one of quasi-3D and 3D characteristics.

44. The system of claim 43, wherein the primary display device is configured to output images having one of quasi-3D and 3D characteristics.

45. The system of claim 39, wherein the adjunct communication device includes a Direct Memory Access (DMA) controller.

46. The system of claim 39, wherein the adjunct communication device excludes a frame buffer for storing adjunct visual content.

47. The system of claim 39, wherein the adjunct communication manager is configured to manage adjunct communication operations further comprising determining whether an adjunct content event corresponds to adjunct visual content that is to be essentially immediately presented to the user.

48. The system of claim 39, wherein the adjunct communication manager is configured to manage adjunct communication operations further comprising determining whether an adjunct content event corresponds to adjunct visual content for which presentation to the user is to be deferred until receipt of user input following transfer of an adjunct content notification corresponding to the adjunct visual content to the adjunct communication device.

49. The system of claim 39, wherein the adjunct visual content comprises a set of predefined visual sequences, each predefined visual sequence within the set of predefined visual sequences corresponding to a predetermined type of application program outcome that can result from user interaction with the application program.

50. The system of claim 49, wherein the adjunct communication manager is configured to manage adjunct communication operations further comprising:
    determining whether a first predetermined type of application program outcome within a set of predetermined types of application program outcomes has occurred during application program execution; and
    transferring a first predefined visual sequence within the set of predefined visual sequences to the adjunct communication device in response to occurrence of the first predetermined type of application program outcome.

51. The system of claim 50, wherein the first predetermined type of application program outcome corresponds to an electronic game event.

52. The system of claim 51, wherein the electronic game event corresponds to one of user transition to a next game level, user interaction with a non-player character, and user interaction with a remote user.

53. The system of claim 39, wherein the adjunct visual content corresponds to one of a virtual user location with respect to a visual navigational aid, a request for a live chat session, and a pre-recorded message.

54. The system of claim 39, wherein the visual environment further includes a set of user selectable graphical elements configured to control aspects of adjunct communication device operation in response to user input, and wherein at least one of the application program and the adjunct communication manager is configured to manage the visual presentation of the set of user selectable graphical elements.

55. The system of claim 39, wherein the set of memories further stores program instructions comprising an adjunct communication device configuration module for generating a configuration interface by which particular types of visual content can be selectively identified as adjunct visual content for presentation by the adjunct communication device in response to user input.

56. The system of claim 39, wherein the adjunct communication device further comprises a set of adjunct input elements configured to detect one of user proximity, user presence, user motion, and user gestures in a spatial region proximate to the adjunct communication device.

57. The system of claim 39, wherein the adjunct communication device further comprises an illumination apparatus configured to output illumination signals corresponding to an adjunct content event.

58. The system of 57, wherein the illumination apparatus is configured to output illumination signals that provide one of an indication of adjunct visual content available for user selection, an occurrence of a predetermined application program event, and an indication of a level of user proficiency in interacting with the application program.

59. The system of claim 39, wherein the adjunct communication device is configured to retrieve adjunct communication device firmware in association with adjunct communication device initialization operations.

60. The system of claim 59, wherein the adjunct communication device initialization operations are performed in association with a peripheral device enumeration process.

61. The system of claim 39, further comprising a first communication interface coupled to the processing unit and a second communication interface coupled to the adjunct communication device, the first communication interface selectively couplable to the second communication interface to enable selective coupling between the processing unit and the adjunct communication device.

62. The system of claim 60, wherein each of the first communication interface and the second communication interface comprises a USB interface.

63. The system of claim 39, further comprising a display-enabled user input apparatus coupled to the processing unit, the display-enabled user input apparatus separate from the adjunct communication device and comprising a set of user selectable input elements configured to transmit optical signals corresponding to graphical images.

64. The system of claim 63, further comprising a set of user selectable graphical elements configured for controlling aspects of adjunct communication device operation in response to user input, the set of user selectable graphical control elements displayable by at least one of the primary display device and the display-enabled user input apparatus.

65. An adjunct communication device comprising:
a housing;
a base;
a display unit at least partially residing in the base, the display unit comprising an output surface, the output surface configured to output optical signals relative to a first set of optical travel paths; and
a viewing screen mounted within the housing, the viewing screen comprising a viewing surface, the viewing surface configured to receive the optical signals, and further configured to at least partially direct the optical signals relative to a second set of optical travel paths, wherein the viewing screen is reflective;
wherein the second set of optical travel paths defines a viewing angle;
wherein the viewing surface is disposed at an acute angle relative to the output surface;
wherein the viewing surface is slanted towards the viewing angle; and
wherein the viewing surface is curved.

66. The adjunct communication device of claim 65, wherein a first optical travel path of the first set of optical travel paths is at a first angle relative to the viewing surface, wherein a second optical travel path of the first set of optical travel paths is at a second angle relative to the viewing surface, the first optical travel path being nearer to a viewer than the second optical travel path, the first angle being smaller than the second angle.

67. The adjunct communication device of claim 65, wherein each optical travel path of the second set of optical travel paths is at an obtuse angle relative to a respective optical travel path of the first set of optical travel paths.

68. The adjunct communication device of claim 65, wherein the viewing screen comprises a reflective coating applied thereto.

69. The adjunct communication device of claim 65, further comprising:
a set of optical elements disposed between the output surface and the viewing screen, the set of optical elements configured to define an extent of the first set of optical travel paths.

70. An adjunct communication device comprising:
a housing;
a base;
a display unit at least partially residing in the base, the display unit comprising an output surface, the output surface configured to output optical signals relative to a first set of optical travel paths; and
a viewing screen mounted within the housing, the viewing screen comprising a viewing surface, the viewing surface configured to receive the optical signals, and further configured to at least partially direct the optical signals relative to a second set of optical travel paths,
wherein the second set of optical travel paths defines a viewing angle;
wherein the viewing surface is disposed at an acute angle relative to the output surface;
wherein a first optical travel path of the first set of optical travel paths is at a first angle relative to the viewing surface, wherein a second optical travel path of the first set of optical travel paths is at a second angle relative to the viewing surface, the first optical travel path being nearer to a viewer than the second optical travel path, the first angle being smaller than the second angle;
wherein the viewing screen is reflective; and
wherein the viewing surface is curved.

71. The adjunct communication device of claim 70, wherein the viewing screen is configured to magnify an image received from the display unit, by a predetermined magnification factor.

72. The adjunct communication device of claim 70, wherein the housing comprises an at least substantially optically transparent portion for the second set of travel paths to extend through the housing.

73. The adjunct communication device of claim 70 wherein the base comprises an opening for the optical signals to propagate from the display unit to the viewing screen along the first set of optical travel paths.

74. The adjunct communication device of claim 70, wherein the display unit is disposed at a first angle relative to a first plane, the first plane being parallel to a bottom surface of the base; and the viewing screen is disposed at a second angle relative to a second plane, the second plane being parallel to the first plane.

75. The adjunct communication device of claim 74, wherein the first angle and the second angle are selectable for supporting an intended viewing angle.

76. The adjunct communication device of claim 70, further comprising a set of optical elements disposed between the output surface and the viewing screen, the set of optical elements configured to define the viewing angle by affecting the first set of optical travel paths.

77. The adjunct communication device of claim 70, further comprising a control unit coupled to the display unit, wherein the control unit comprises a microcontroller configured to act as a target device with respect to a host computing system to which the adjunct communication device is couplable.

* * * * *